(12) United States Patent
Arora et al.

(10) Patent No.: US 11,099,963 B2
(45) Date of Patent: Aug. 24, 2021

(54) ALERT DEPENDENCY DISCOVERY

(71) Applicant: Rubrik, Inc., Palo Alto, CA (US)

(72) Inventors: Gurjeet S. Arora, Palo Alto, CA (US); Karan Jayesh Bavishi, San Francisco, CA (US); Daniel Talamas Cano, Palo Alto, CA (US); John Louie, Redwood City, CA (US); Chetas Joshi, Mountain City, CA (US); Matthew Edward Noe, San Francisco, CA (US)

(73) Assignee: Rubrik, Inc., Palo Alto, CA (US)

( * ) Notice: Subject to any disclaimer, the term of this patent is extended or adjusted under 35 U.S.C. 154(b) by 266 days.

(21) Appl. No.: 16/264,264

(22) Filed: Jan. 31, 2019

(65) Prior Publication Data

US 2020/0250062 A1 Aug. 6, 2020

(51) Int. Cl.
*G06F 11/32* (2006.01)
*G06F 11/34* (2006.01)
*G06F 11/30* (2006.01)
*G06F 11/07* (2006.01)

(52) U.S. Cl.
CPC ........ *G06F 11/327* (2013.01); *G06F 11/3006* (2013.01); *G06F 11/3089* (2013.01); *G06F 11/3495* (2013.01); *G06F 11/0766* (2013.01)

(58) Field of Classification Search
CPC .............. G06F 11/327; G06F 11/3006; G06F 11/3089; G06F 11/3495; G06F 11/0766
See application file for complete search history.

(56) References Cited

U.S. PATENT DOCUMENTS

| | | | |
|---|---|---|---|
| 7,792,660 B2 * | 9/2010 | Iyengar | G05B 23/024 702/183 |
| 7,953,815 B2 | 5/2011 | Kaufman et al. | |
| 10,257,060 B2 | 4/2019 | Diwakar | |
| 10,333,952 B2 | 6/2019 | Chen et al. | |
| 10,534,658 B2 | 1/2020 | Li et al. | |
| 10,560,309 B1 | 2/2020 | Chitalia et al. | |
| 10,595,887 B2 | 3/2020 | Shelton, IV et al. | |
| 10,887,158 B2 | 1/2021 | Arora et al. | |
| 10,979,281 B2 | 4/2021 | Arora et al. | |

(Continued)

OTHER PUBLICATIONS

"U.S. Appl. No. 16/264,369, Non Final Office Action dated Mar. 6, 2020", 8 pages.
"U.S. Appl. No. 16/264,224, Examiner Interview Summary dated Aug. 18, 2020", 3 pgs.
"U.S. Appl. No. 16/264,224, Response filed Aug. 19, 2020 to Non Final Office Action dated May 20, 2020", 12 pgs.

(Continued)

*Primary Examiner* — Manuel L Barbee
(74) *Attorney, Agent, or Firm* — Schwegman Lundberg & Woessner, P.A.

(57) ABSTRACT

Various embodiments provide for alert generation based on alert dependency. For some embodiments, the alert dependency checking facilitates alert noise reduction. Various embodiments described herein dynamically find or discover alert dependencies based on one or more alerts currently active, one or more active alerts generated in the past, or some combination of both. Various embodiments described herein provide alert monitoring that adapts based on an alert state of a machine. Various embodiments described herein generate a health score for a machine based on an alert state of the machine. Various embodiments described herein provide a tool for managing definitions of one or more alerts that can be identified as an active alert for a machine.

17 Claims, 15 Drawing Sheets

(56) References Cited

U.S. PATENT DOCUMENTS

| | | | |
|---|---|---|---|
| 2002/0019870 A1* | 2/2002 | Chirashnya | H04L 41/142 709/224 |
| 2003/0135610 A1* | 7/2003 | Ch'ng | H04L 41/0631 709/224 |
| 2009/0271349 A1* | 10/2009 | Allen | G06F 16/24565 706/47 |
| 2012/0069131 A1 | 3/2012 | Abelow | |
| 2014/0149568 A1* | 5/2014 | Kruempelmann | H04L 41/0622 709/224 |
| 2017/0046127 A1 | 2/2017 | Fletcher et al. | |
| 2017/0353491 A1 | 12/2017 | Gukal et al. | |
| 2018/0034836 A1* | 2/2018 | Chen | H04L 63/1425 |
| 2018/0284735 A1 | 10/2018 | Cella et al. | |
| 2019/0087253 A1 | 3/2019 | Li et al. | |
| 2019/0141058 A1 | 5/2019 | Hassanzadeh et al. | |
| 2019/0163551 A1 | 5/2019 | Cheriton | |
| 2020/0252261 A1 | 8/2020 | Arora et al. | |
| 2020/0252264 A1 | 8/2020 | Arora et al. | |

OTHER PUBLICATIONS

"U.S. Appl. No. 16/264,224, Notice of Allowance dated Sep. 2, 2020", 9 pgs.

"U.S. Appl. No. 16/264,369, Final Office Action dated Sep. 16, 2020", 9 pgs.

"U.S. Appl. No. 16/264,224, Corrected Notice of Allowability dated Oct. 19, 2020", 2 pgs.

"U.S. Appl. No. 16/264,224, Non Final Office Action dated May 20, 2020", 13 pages.

"U.S. Appl. No. 16/264,369, Response filed May 5, 2020 to Non Final Office Action dated Mar. 6, 2020", 10 pages.

"U.S. Appl. No. 16/264,369, Response filed Nov. 13, 2020 to Final Office Action dated Sep. 16, 2020", 11 pgs.

"U.S. Appl. No. 16/264,369, Examiner Interview Summary dated Nov. 17, 2020", 2 pgs.

"U.S. Appl. No. 16/264,369, Notice of Allowance dated Dec. 3, 2020", 7 pgs.

"U.S. Appl. No. 16/264,369, Corrected Notice of Allowability dated Mar. 10, 2021", 2 pgs.

\* cited by examiner

US 11,099,963 B2

ALERT DEPENDENCY DISCOVERY

TECHNICAL FIELD

Embodiments described herein relate to alert generation and, more particularly, to systems, methods, devices, and machine-readable media for alert generation based on alert dependency.

BACKGROUND

It is common practice to monitor the operation of systems (e.g., physical or virtual machines, software applications, and cloud-based services) to ensure system availability (e.g., system up-time) and reliability (e.g., ability to meet performance requirements under a service level agreement (SLA)). To facilitate such monitoring, several conventional tools exist for detecting system issues (e.g., erroneous system behavior) and alerting a user (e.g., administrator or engineering team) to such issues, preferably prior to a system suffering one or more critical failures so that the user can respond with appropriate action (e.g., proactive system maintenance, engineering intervention, technical triage, etc.). Unfortunately, conventional approaches to generating alerts for detected system issues can be quite noisy (e.g., several alerts may be generated for the same single system issue), which in turn can render it difficult for a user reviewing the alerts to determine a root-cause of the alerts or problem-solve a potential or actual system issue.

BRIEF DESCRIPTION OF THE DRAWINGS

Various ones of the appended drawings merely illustrate various embodiments of the present disclosure and should not be considered as limiting its scope.

DETAILED DESCRIPTION

Figure 1A:
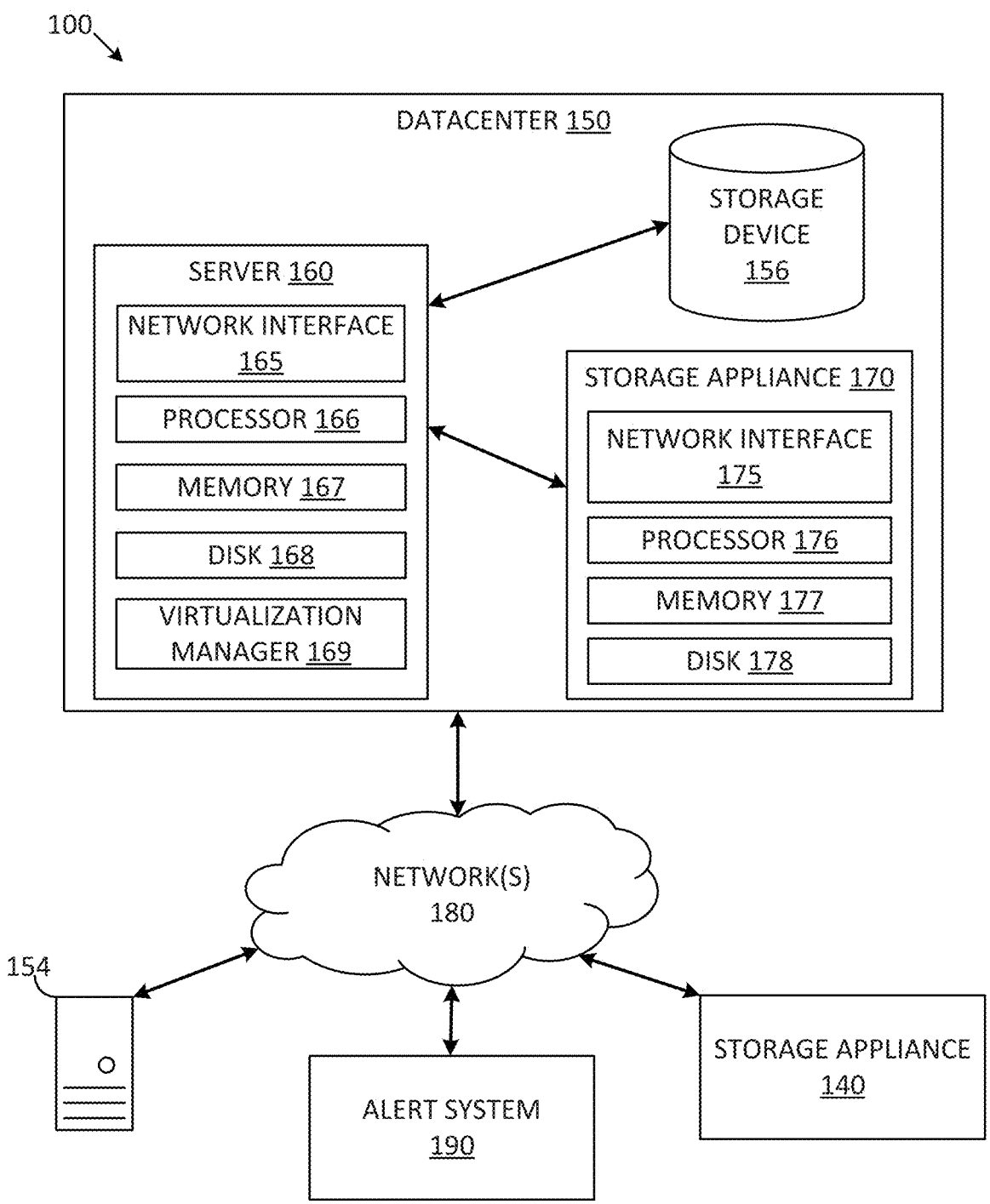
FIG. 1A is a block diagram illustrating an example networked computing environment in which some embodiments described herein are practiced.

Various embodiments described herein relate to alert generation based on alert dependency, which can enable more intelligent (e.g., targeted) alert generation for a system (e.g., physical or virtual machine). According to various embodiments described herein, one or more active alerts are generated with respect to a machine (e.g., a computing node implemented by a physical or virtual machine) based on telemetry data provided by the machine. Various embodiments described herein generate one or more active alerts based on checking one or more dependencies between a plurality of alerts prior to generating the active alerts. For some embodiments, the alert dependency checking facilitates alert noise reduction (or suppression), which in turn can enable some embodiments to generate active alerts that are targeted (e.g., active alerts targeted to the root-causes that are causing generation of the active alerts rather than ones relating to side effects resulting from the root-causes). Various embodiments described herein dynamically find or discover alert dependencies based on one or more alerts currently active (e.g., active alerts), one or more active alerts generated in the past (e.g., historical active alerts), or some combination of both. Various embodiments described herein provide alert monitoring that adapts based on an alert state of a machine, where the alert state may be determined based on one or more active alerts generated for the machine as described herein. Various embodiments described herein generate a health score for a machine based on an alert state of the machine. Various embodiments described herein provide a tool for managing definitions of one or more alerts that can be identified as an active alert for a machine (by techniques described herein), where alert definition management can include defining (e.g., creating) new alerts that can be identified for the machine as active.

According to some embodiments, an alert system generates an active alert for a machine (e.g., physical or virtual machine) based on alert dependency checking. A data collection service (e.g., collector service) on the machine can gather telemetry data, such as log data or metric data, on the machine and provide (e.g., transmit) the collected telemetry data to the alert system. The telemetry data can be provided to the alert system via a telemetry datastore (e.g., telemetry database or repository) that stores the collected telemetry data, which the alert system can retrieve from the telemetry datastore (e.g., by way of a datastore query). Based on a set of alert definitions (e.g., stored as alert definition data in an alert definition datastore) corresponding to a set of identifiable alerts for the machine, the alert system can query the telemetry datastore based on the set of alert definitions to determine if any of the set of identifiable alerts should be triggered as a set of triggered alerts for the machine. Based on alert dependency checking (e.g., using alert dependency data) between alerts in the set of triggered alerts, the alert system can filter the set of triggered alerts to generate a set of active alerts to be outputted (e.g., surfaced) by the alert system. The set of active alerts generated by the alert system can be stored as active alert data to an active alert datastore (e.g., database or repository). Eventually (e.g., after a predetermined time period), the active alerts stored in the active alert datastore can be stored (e.g., archived) as historical active alert data on a historical active alert datastore. The historical active alert data can facilitate alert analysis (e.g., to discover a new alert dependency), insight extraction for system operation/maintenance, or alert dashboarding.

For some embodiments, an alert system analyzes historical active alert data, active alert data, or a combination to find correlation between two or more alerts and dynamically discover (e.g., find) alert dependencies based on identified correlations. The alert dependency data can be updated based on the dynamically discovered (e.g., found) alert dependencies. Alternatively or additionally, the alert dependency data can be updated by static alert dependencies defined by a user (e.g., administrator or engineer).

By generating an alert for a machine based on telemetry data, the alert generated by an embodiment can be very effective in proactively detecting erroneous behavior in systems. Various embodiments described herein can reduce or eliminate alert noise, commonly produced by conventional approaches to generating alerts for systems, using alert dependency. In reducing/eliminating alert noise, some embodiments described herein can replace one or more active alerts (e.g., high level active alerts) with one active alert that better indicates a root-cause of alerts with respect to a machine. Further, in reducing/eliminating alert noise, some embodiments described herein can improve triage efficiency for a user (e.g., administrator or engineer) as the user does not have to sift through multiple layers of alerts to find an underlying problem with a machine. For instance, an embodiment described herein can output active alerts for one or more services on a machine that are the root-causes of issue, problems, or failures on the machine, rather than output alerts for one or more services on the machine that are mere side-effects of the root-causes. In this way, an embodiment can be very helpful in providing a user with actionable information.

As used herein, a machine can comprise a physical machine (e.g., physical computer, such as a server or a client computing device) or a virtual machine. As used herein, a system (for which an active alert can be generated) can comprise one or more machines. With respect to a virtual machine, virtualization allows virtual hardware to be created and decoupled from the underlying physical hardware. For example, a hypervisor running on a host machine or server may be used to create one or more virtual machines that may each run the same operating system or different operating systems (e.g., a first virtual machine may run a Windows® operating system and a second virtual machine may run a Unix-like operating system such as OS X®. A virtual machine may comprise a software implementation of a physical machine. The virtual machine may include one or more virtual hardware devices, such as a virtual processor, a virtual memory, a virtual disk, or a virtual network interface card. The virtual machine may load and execute an operating system and applications from the virtual memory. The operating system and applications used by the virtual machine may be stored using the virtual disk. The virtual machine may be stored as a set of files including a virtual disk file for storing the contents of a virtual disk and a virtual machine configuration file for storing configuration settings for the virtual machine. The configuration settings may include the number of virtual processors (e.g., four virtual CPUs), the size of a virtual memory, and the size of a virtual disk (e.g., a 10 GB virtual disk) for the virtual machine.

As used herein, an alert can comprise a notification based on violation of an invariant of a machine. For some embodiments, a definition of an alert for a machine comprises an invariant specified (e.g., defined) in terms of one or more data elements (e.g., attributes), which can be extracted from data provided by the machine (e.g., log data, metric data, or other telemetry data). An alert can be considered triggered by a machine if the presence of one or more data elements (e.g., defining the invariant of the alert) is detected by an embodiment described herein. Presence of the one or more data elements can be detected, for instance, by text search (e.g., based on regular expression search) performed on the data or by detecting a data pattern (e.g., an increase or decrease in a metric). For some embodiments, when an invariant of an alert is violated by a machine, the alert is regarded as a triggered alert that has been triggered by the machine. An example of an alert can include, without limitation, an alert regarding a file system (e.g., software-defined file system (SDFS)) crash with respect to one or more machines (e.g., cluster of machines). Another example of an alert can include, without limitation, an alert regarding memory usage by service getting too high on a machine, which can enable a user to intervene with appropriate action before another service operating on the machine crashes for lack of memory.

Depending on the embodiment, an alert can be one based on log data for a machine. An example of log data can include, without limitation, an error log generated by a service operating on the machine, such a web hosting service or a file sharing service. The log data may be part of telemetry data that is provided by a machine and that is used by some embodiments to identify one or more triggered alerts of the machine as described herein. For some embodiment, an example log-based alert can be triggered based on log data by identifying (e.g., searching for and finding) one or more specific log strings within the log data, which may be facilitated using one or more regular expressions associated with the example log-based alert. An example log-based alert can include a file system crash alert that is identified by identifying a particular string in the log data (e.g., error log) generated by the file system, where the particular string indicates that the file system has crashed.

Depending on the embodiment, an alert can be one based on metric data for a machine. Metric data can comprise, for instance, one or more metric values relating to operation of a service operating on the machine, such a web hosting service or a file sharing service. For some embodiment, an example metric-based alert can be triggered based on metric data when a value of a metric for a machine, a time-series value for a metric, or a function of multiple time-series values for a metric (e.g., for a cluster of machines) is above or below a threshold value (e.g., threshold value associated with the example metric-based alert). An example metric-based alert can include a data chunk allocation error alert that is identified, based on a metric that measures a current data chunk allocation error rate for a machine, by determining that the metric is increasing over time (e.g., based on comparing the metric to a threshold value associated with the data chunk allocation error alert).

As user herein, an identifiable alert can refer to an alert that one or more machines can trigger with respect to an embodiment described herein. Accordingly, the set of identifiable alerts that can be triggered with respect to an embodiment described herein can be determined by the set of alert definitions accessed/accessible by the embodiment. Once an identifiable alert is triggered by a machine, the identifiable alert can be regarded as a triggered alert and one that can be outputted by the embodiment as an active alert (e.g., based on alert dependency checking). For an alert definition for a log-based identifiable alert, the alert definition can specify one or more of the following: a name of the alert (e.g., "SDFS Crash"); a description of the alert (e.g., "SDFS Crash Detected"); an element (e.g., service, hardware component, machine) being monitored for the log-based identifiable alert (e.g., SDFS); a query used to obtain data (e.g., telemetry data) relevant to determining whether that the alert has triggered; a monitoring frequency for scanning for the alert (e.g., 120 minutes); a time window for determining alert dependency of the alert (e.g., 120 minutes); and one or more log strings (e.g., specified by a regular expression) being sought for the alert (e.g., "ALERT (sdfs_crash)").

For an alert definition for a metric-based identifiable alert, the alert definition can specify: a name of the alert (e.g., "CacheMemoryHigh"); a description of the alert (e.g., "Cache memory is high"); an element (e.g., service, hardware component, machine) being monitored for the log-based identifiable alert (e.g., CacheMemory); a query used to obtain data (e.g., telemetry data) relevant to determining whether that the alert has triggered; a name of the metric upon which the alert is triggered; a function/process (e.g., max function, keep last value function, a derivative function) and a threshold value (e.g., 3 GB) for transforming data from a machine into transformed data (e.g., time-series data) that is used to determine whether the alert is triggered; a comparator (e.g., greater than or equal to) to be used to compare the output of the function/process to the threshold value; a monitoring frequency for scanning for the alert (e.g., 120 minutes); and a time window for determining alert dependency of the alert (e.g., 120 minutes).

As used herein, an active alert can refer to an alert that is outputted as currently active by an embodiment described herein. For instance, an active alert can be an alert outputted (e.g., surfaced) by an embodiment for user notification or review. Outputting an alert can comprise posting an active alert to a graphical user interface (GUI) dashboard, which a user (e.g., administrator or engineer attention) can use to actively debug issues, problems, or failures with respect to a machine. As used herein, an identifiable alert can refer to a possible alert that can be identified for a machine. An example active alert can comprise a plurality of details regarding the active alert (e.g., information that a user can use to debug a root-cause of the active alert), such as an identifier (e.g., descriptive alert name or an alert key string) for the active alert, an identifier for the alert type corresponding to the active alert, a description for the active alert, an identifier (e.g., node name) for a machine associated with the active alert, an identifier (e.g., node cluster name) for a machine cluster associated with the active alert, a client name (e.g., organization name) associated with the active alert, an identifier (e.g., service name) for a service associated with the active alert, a version (e.g., version number) for a service associated with the active alert, time at which the active alert was triggered, criticality of the active alert, a link to a portion of telemetry data (e.g., time-series data generated based on the telemetry data) corresponding to a time window in which the active alert is triggered, and log information/context that caused the active alert to trigger (if the active alert is a log-based alert).

As used herein, an alert A can be considered dependent on alert B if an occurrence of alert B can explain the occurrence of alert A. Accordingly, for some embodiments, alert A is filtered (e.g., suppressed) from being generated as an active alert when both alert A and alert B are triggered by a machine and alert A has been determined to be dependent on alert B (e.g., based on alert dependency dynamically discovered or statically defined by a user). A particular embodiment may, for example, dynamically discover (e.g., based on past and present active alerts) that a file system crash alert is dependent on a service-high-memory usage alert and, based on the dynamically discovered dependency, filter out (e.g., suppress) the file system crash alert from being an active alert and permitting the service-high-memory usage alert to be generated as an active alert in response to both the file system crash alert and the high-memory usage alert being presently trigged by a machine. In doing so, an embodiment can better enable a user (e.g., administrator) to determine that high memory usage by a service operating on the machine is a root-cause for one or more problems observed on the machine (e.g., such a file system crash).

As used herein, time-series data can comprise a series of data points (e.g., values) for a variable (e.g., a particular metric, or status of a particular alert) that are indexed or listed in time order (e.g., sequenced according to discrete time intervals that may be equally spaced, such as spaced by minutes, seconds, or microseconds). For some embodiments, a time-series function or process is applied to data (e.g., telemetry data) provided by a machine to convert the data to time-series data that an embodiment can analyze to determine if a particular alert has been triggered.

Reference will now be made in detail to embodiments of the present disclosure, examples of which are illustrated in the appended drawings. The present disclosure may, however, be embodied in many different forms and should not be construed as being limited to the embodiments set forth herein.

FIG. 1A depicts one embodiment of a networked computing environment 100 in which some embodiments are practiced. As depicted, the networked computing environment 100 includes a data center 150, a storage appliance 140, an alert system 190, and a computing device 154 in communication with each other via one or more networks 180. The networked computing environment 100 may include a plurality of computing devices interconnected through one or more networks 180. The one or more networks 180 may allow computing devices and/or storage devices to connect to and communicate with other computing devices and/or other storage devices. In some cases, the networked computing environment may include other computing devices and/or other storage devices not shown. The other computing devices may include, for example, a mobile computing device, a non-mobile computing device, a server, a workstation, a laptop computer, a tablet computer, a desktop computer, or an information processing system. The other storage devices may include, for example, a storage area network storage device, a networked-attached storage device, a hard disk drive, a solid-state drive, or a data storage system.

The data center 150 may include one or more servers, such as server 160, in communication with one or more storage devices, such as storage device 156. The one or more servers may also be in communication with one or more storage appliances, such as storage appliance 170. The server 160, storage device 156, and storage appliance 170 may be in communication with each other via a networking fabric connecting servers and data storage units within the data center to each other. The storage appliance 170 may include a data management system for backing up virtual machines and/or files within a virtualized infrastructure. The server 160 may be used to create and manage one or more virtual machines associated with a virtualized infrastructure. The one or more virtual machines may run various applications, such as a cloud-based service, a database application or a web server. The storage device 156 may include one or more hardware storage devices for storing data, such as a hard disk drive (HDD), a magnetic tape drive, a solid-state drive (SSD), a storage area network (SAN) storage device, or a networked-attached storage (NAS) device. In some cases, a data center, such as data center 150, may include thousands of servers and/or data storage devices in communication with each other. The data storage devices may comprise a tiered data storage infrastructure (or a portion of a tiered data storage infrastructure). The tiered data storage infrastructure may allow for the movement of data across different tiers of a data storage infrastructure between higher-cost, higher-performance storage devices (e.g., solid-state drives and hard disk drives) and relatively lower-cost, lower-performance storage devices (e.g., magnetic tape drives).

The one or more networks 180 may include a secure network such as an enterprise private network, an unsecure network such as a wireless open network, a local area network (LAN), a wide area network (WAN), and the Internet. The one or more networks 180 may include a cellular network, a mobile network, a wireless network, or a wired network. Each network of the one or more networks 180 may include hubs, bridges, routers, switches, and wired transmission media such as a direct-wired connection. The one or more networks 180 may include an extranet or other private network for securely sharing information or providing controlled access to applications or files.

A server, such as server 160, may allow a client to download information or files (e.g., executable, text, application, audio, image, or video files) from the server or to perform a search query related to particular information stored on the server. In some cases, a server may act as an application server or a file server. In general, a server may refer to a hardware device that acts as the host in a client-server relationship or a software process that shares a resource with or performs work for one or more clients.

One embodiment of server 160 includes a network interface 165, processor 166, memory 167, disk 168, and virtualization manager 169 all in communication with each other. Network interface 165 allows server 160 to connect to one or more networks 180. Network interface 165 may include a wireless network interface and/or a wired network interface. Processor 166 allows server 160 to execute computer readable instructions stored in memory 167. Processor 166 may include one or more processing units, such as one or more CPUs and/or one or more GPUs. Memory 167 may comprise one or more types of memory (e.g., RAM, SRAM, DRAM, ROM, EEPROM, Flash, etc.). Disk 168 may include a hard disk drive and/or a solid-state drive. Memory 167 and disk 168 may comprise hardware storage devices.

The virtualization manager 169 may manage a virtualized infrastructure and perform management operations associated with the virtualized infrastructure. The virtualization manager 169 may manage the provisioning of virtual machines running within the virtualized infrastructure and provide an interface to computing devices interacting with the virtualized infrastructure. In one example, the virtualization manager 169 may set a virtual machine into a frozen state in response to a snapshot request made via an application programming interface (API) by a storage appliance, such as storage appliance 170. Setting the virtual machine into a frozen state may allow a point in time snapshot of the virtual machine to be stored or transferred. In one example, updates made to a virtual machine that has been set into a frozen state may be written to a separate file (e.g., an update file) while the virtual disk file associated with the state of the virtual disk at the point in time is frozen. The virtual disk file may be set into a read-only state to prevent modifications to the virtual disk file while the virtual machine is in the frozen state. The virtualization manager 169 may then transfer data associated with the virtual machine (e.g., an image of the virtual machine or a portion of the image of the virtual machine) to a storage appliance in response to a request made by the storage appliance. After the data associated with the point in time snapshot of the virtual machine has been transferred to the storage appliance, the virtual machine may be released from the frozen state (i.e., unfrozen) and the updates made to the virtual machine and stored in the separate file may be merged into the virtual disk file. The virtualization manager 169 may perform various virtual machine related tasks, such as cloning virtual machines, creating new virtual machines, monitoring the state of virtual machines, moving virtual machines between physical hosts for load balancing purposes, and facilitating backups of virtual machines.

One embodiment of storage appliance 170 includes a network interface 175, processor 176, memory 177, and disk 178 all in communication with each other. Network interface 175 allows storage appliance 170 to connect to one or more networks 180. Network interface 175 may include a wireless network interface and/or a wired network interface. Processor 176 allows storage appliance 170 to execute computer readable instructions stored in memory 177. Processor 176 may include one or more processing units, such as one or more CPUs and/or one or more GPUs. Memory 177 may comprise one or more types of memory (e.g., RAM, SRAM, DRAM, ROM, EEPROM, NOR Flash, NAND Flash, etc.). Disk 178 may include a hard disk drive and/or a solid-state drive. Memory 177 and disk 178 may comprise hardware storage devices.

In one embodiment, the storage appliance 170 may include four machines. Each of the four machines may include a multi-core CPU, 64 GB of RAM, a 400 GB SSD, three 4 TB HDDs, and a network interface controller. In this case, the four machines may be in communication with the one or more networks 180 via the four network interface controllers. The four machines may comprise four nodes of a server cluster. The server cluster may comprise a set of physical machines that are connected together via a network. The server cluster may be used for storing data associated with a plurality of virtual machines, such as backup data associated with different point in time versions of 1000 virtual machines.

The networked computing environment 100 may provide a cloud computing environment for one or more computing devices. Cloud computing may refer to Internet-based computing, wherein shared resources, software, and/or information may be provided to one or more computing devices on-demand via the Internet. The networked computing environment 100 may comprise a cloud computing environment providing Software-as-a-Service (SaaS) or Infrastructure-as-a-Service (IaaS) services. SaaS may refer to a software distribution model in which applications are hosted by a service provider and made available to end users over the Internet. In one embodiment, the networked computing environment 100 may include a virtualized infrastructure that provides software, data processing, and/or data storage services to end users accessing the services via the networked computing environment. In one example, networked computing environment 100 may provide cloud-based work productivity or business-related applications to a computing device, such as computing device 154. The storage appliance 140 may comprise a cloud-based data management system for backing up virtual machines and/or files within a virtualized infrastructure, such as virtual machines running on server 160 or files stored on server 160.

In some cases, networked computing environment 100 may provide remote access to secure applications and files stored within data center 150 from a remote computing device, such as computing device 154. The data center 150 may use an access control application to manage remote access to protected resources, such as protected applications, databases, or files located within the data center. To facilitate remote access to secure applications and files, a secure network connection may be established using a virtual private network (VPN). A VPN connection may allow a remote computing device, such as computing device 154, to securely access data from a private network (e.g., from a company file server or mail server) using an unsecure public network or the Internet. The VPN connection may require client-side software (e.g., running on the remote computing device) to establish and maintain the VPN connection. The VPN client software may provide data encryption and encapsulation prior to the transmission of secure private network traffic through the Internet.

In some embodiments, the storage appliance 170 may manage the extraction and storage of virtual machine snapshots associated with different point in time versions of one or more virtual machines running within the data center 150. A snapshot of a virtual machine may correspond with a state of the virtual machine at a particular point in time. In response to a restore command from the server 160, the storage appliance 170 may restore a point in time version of a virtual machine or restore point in time versions of one or more files located on the virtual machine and transmit the restored data to the server 160. In response to a mount command from the server 160, the storage appliance 170 may allow a point in time version of a virtual machine to be mounted and allow the server 160 to read and/or modify data associated with the point in time version of the virtual machine. To improve storage density, the storage appliance 170 may deduplicate and compress data associated with different versions of a virtual machine and/or deduplicate and compress data associated with different virtual machines. To improve system performance, the storage appliance 170 may first store virtual machine snapshots received from a virtualized environment in a cache, such as a flash-based cache. The cache may also store popular data or frequently accessed data (e.g., based on a history of virtual machine restorations, incremental files associated with commonly restored virtual machine versions) and current day incremental files or incremental files corresponding with snapshots captured within the past 24 hours.

An incremental file may comprise a forward incremental file or a reverse incremental file. A forward incremental file may include a set of data representing changes that have occurred since an earlier point in time snapshot of a virtual machine. To generate a snapshot of the virtual machine corresponding with a forward incremental file, the forward incremental file may be combined with an earlier point in time snapshot of the virtual machine (e.g., the forward incremental file may be combined with the last full image of the virtual machine that was captured before the forward incremental was captured and any other forward incremental files that were captured subsequent to the last full image and prior to the forward incremental file). A reverse incremental file may include a set of data representing changes from a later point in time snapshot of a virtual machine. To generate a snapshot of the virtual machine corresponding with a reverse incremental file, the reverse incremental file may be combined with a later point in time snapshot of the virtual machine (e.g., the reverse incremental file may be combined with the most recent snapshot of the virtual machine and any other reverse incremental files that were captured prior to the most recent snapshot and subsequent to the reverse incremental file).

The storage appliance 170 may provide a user interface (e.g., a web-based interface or a graphical user interface) that displays virtual machine backup information such as identifications of the virtual machines protected and the historical versions or time machine views for each of the virtual machines protected. A time machine view of a virtual machine may include snapshots of the virtual machine over a plurality of points in time. Each snapshot may comprise the state of the virtual machine at a particular point in time. Each snapshot may correspond with a different version of the virtual machine (e.g., Version 1 of a virtual machine may correspond with the state of the virtual machine at a first point in time and Version 2 of the virtual machine may correspond with the state of the virtual machine at a second point in time subsequent to the first point in time).

The user interface may enable an end user of the storage appliance 170 (e.g., a system administrator or a virtualization administrator) to select a particular version of a virtual machine to be restored or mounted. When a particular version of a virtual machine has been mounted, the particular version may be accessed by a client (e.g., a virtual machine, a physical machine, or a computing device) as if the particular version was local to the client. A mounted version of a virtual machine may correspond with a mount point directory (e.g., /snapshots/VM5/Version23). In one example, the storage appliance 170 may run an NFS server and make the particular version (or a copy of the particular version) of the virtual machine accessible for reading and/or writing. The end user of the storage appliance 170 may then select the particular version to be mounted and run an application (e.g., a data analytics application) using the mounted version of the virtual machine. In another example, the particular version may be mounted as an iSCSI target.

In some embodiments, the alert system 190 provides active alert generation for various hardware and software entities/components within the networked computing environment 100, such as the server 160, the storage device 156, the storage appliance 170, or the storage appliance 140. According to some embodiments, each of the server 160, the storage device 156, the storage appliance 170, or the storage appliance 140 (e.g., services running thereon, such as the virtualization manager 169 of the server 160) provide the alert system 190 with data (e.g., telemetry data), which the alert system 190 can operate upon as described herein to generate active alerts. Though not illustrated, one or more hardware and software entities/components within the networked computing environment 100 can each include a data collection service (e.g., a telemetry data collector service) that enables them to provide (e.g., stream in real-time) data for use by the alert system 190.

According to some embodiments, the alert system 190 generates one or more active alerts with respect to one or more hardware and software entities/components within the networked computing environment 100 based on telemetry data provided by those entities/components. The alert system 190 can generate one or more active alerts based on checking one or more dependencies between a plurality of alerts prior to generating the active alerts, which can permit the alert system 190 to reduce or suppress alert noise and generate active alerts that are targeted on the root-cause of a problem or issue with respect to the entities/components. For some embodiments, the alert system 190 dynamically finds or discovers alert dependencies based on one or more active alerts that are currently active, one or more active alerts that were active in the past (e.g., ones archived as historical active alerts), or some combination of both. For some embodiments, the alert system 190 provides alert monitoring of an entity or component that adapts based on an alert state of the entity or component. For some embodiments, the alert system 190 generates a health score for an entity or component based on an alert state of the entity or component. Additionally, for some embodiments, the alert system 190 provides a tool for managing definitions of one or more alerts that can be identified as an active alert for an entity or component, where alert definition management can include defining (e.g., creating) new alerts that can be identified for the machine as active. More regarding an example of the alert system 190 is described with respect to FIG. 2.

Figure 1B:
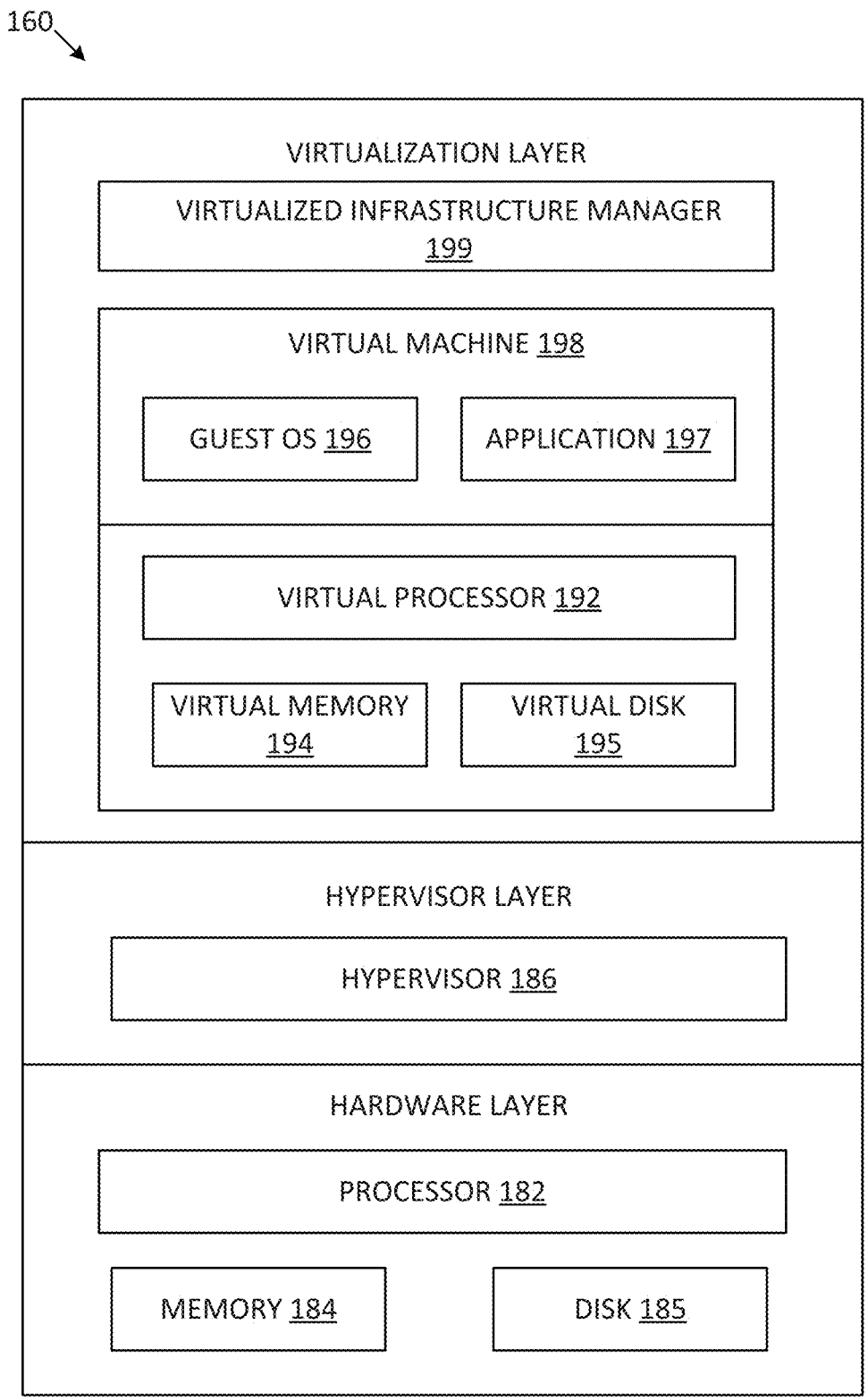
FIG. 1B depicts one embodiment of a server in the example networked computing environment of FIG. 1A.

FIG. 1B depicts one embodiment of server 160 in FIG. 1A. The server 160 may comprise one server out of a plurality of servers that are networked together within a data center. In one example, the plurality of servers may be positioned within one or more server racks within the data center. As depicted, the server 160 includes hardware-level components and software-level components. The hardware-level components include one or more processors 182, one or more memory 184, and one or more disks 185. The software-level components include a hypervisor 186, a virtualized infrastructure manager 199, and one or more virtual machines, such as virtual machine 198. The hypervisor 186 may comprise a native hypervisor or a hosted hypervisor. The hypervisor 186 may provide a virtual operating platform for running one or more virtual machines, such as virtual machine 198. Virtual machine 198 includes a plurality of virtual hardware devices including a virtual processor 192, a virtual memory 194, and a virtual disk 195. The virtual disk 195 may comprise a file stored within the one or more disks 185. In one example, a virtual machine may include a plurality of virtual disks, with each virtual disk of the plurality of virtual disks associated with a different file stored on the one or more disks 185. Virtual machine 198 may include a guest operating system 196 that runs one or more applications, such as application 197.

The virtualized infrastructure manager 199, which may correspond with the virtualization manager 169 in FIG. 1A, may run on a virtual machine or natively on the server 160. The virtualized infrastructure manager 199 may provide a centralized platform for managing a virtualized infrastructure that includes a plurality of virtual machines. The virtualized infrastructure manager 199 may manage the provisioning of virtual machines running within the virtualized infrastructure and provide an interface to computing devices interacting with the virtualized infrastructure. The virtualized infrastructure manager 199 may perform various virtualized infrastructure related tasks, such as cloning virtual machines, creating new virtual machines, monitoring the state of virtual machines, and facilitating backups of virtual machines.

In one embodiment, the server 160 may use the virtualized infrastructure manager 199 to facilitate backups for a plurality of virtual machines (e.g., eight different virtual machines) running on the server 160. Each virtual machine running on the server 160 may run its own guest operating system and its own set of applications. Each virtual machine running on the server 160 may store its own set of files using one or more virtual disks associated with the virtual machine (e.g., each virtual machine may include two virtual disks that are used for storing data associated with the virtual machine).

In one embodiment, a data management application running on a storage appliance, such as storage appliance 140 in FIG. 1A or storage appliance 170 in FIG. 1A, may request a snapshot of a virtual machine running on server 160. The snapshot of the virtual machine may be stored as one or more files, with each file associated with a virtual disk of the virtual machine. A snapshot of a virtual machine may correspond with a state of the virtual machine at a particular point in time. The particular point in time may be associated with a time stamp. In one example, a first snapshot of a virtual machine may correspond with a first state of the virtual machine (including the state of applications and files stored on the virtual machine) at a first point in time (e.g., 5:30 p.m. on Jun. 29, 2024) and a second snapshot of the virtual machine may correspond with a second state of the virtual machine at a second point in time subsequent to the first point in time (e.g., 5:30 p.m. on Jun. 30, 2024).

In response to a request for a snapshot of a virtual machine at a particular point in time, the virtualized infrastructure manager 199 may set the virtual machine into a frozen state or store a copy of the virtual machine at the particular point in time. The virtualized infrastructure manager 199 may then transfer data associated with the virtual machine (e.g., an image of the virtual machine or a portion of the image of the virtual machine) to the storage appliance. The data associated with the virtual machine may include a set of files including a virtual disk file storing contents of a virtual disk of the virtual machine at the particular point in time and a virtual machine configuration file storing configuration settings for the virtual machine at the particular point in time. The contents of the virtual disk file may include the operating system used by the virtual machine, local applications stored on the virtual disk, and user files (e.g., images and word processing documents). In some cases, the virtualized infrastructure manager 199 may transfer a full image of the virtual machine to the storage appliance or a plurality of data blocks corresponding with the full image (e.g., to enable a full image-level backup of the virtual machine to be stored on the storage appliance). In other cases, the virtualized infrastructure manager 199 may transfer a portion of an image of the virtual machine associated with data that has changed since an earlier point in time prior to the particular point in time or since a last snapshot of the virtual machine was taken. In one example, the virtualized infrastructure manager 199 may transfer only data associated with virtual blocks stored on a virtual disk of the virtual machine that have changed since the last snapshot of the virtual machine was taken. In one embodiment, the data management application may specify a first point in time and a second point in time and the virtualized infrastructure manager 199 may output one or more virtual data blocks associated with the virtual machine that have been modified between the first point in time and the second point in time.

In some embodiments, the server 160 may or the hypervisor 186 may communicate with a storage appliance, such as storage appliance 140 in FIG. 1A or storage appliance 170 in FIG. 1A, using a distributed file system protocol such as Network File System (NFS) Version 3. The distributed file system protocol may allow the server 160 or the hypervisor 186 to access, read, write, or modify files stored on the storage appliance as if the files were locally stored on the server. The distributed file system protocol may allow the server 160 or the hypervisor 186 to mount a directory or a portion of a file system located within the storage appliance.

Figure 1C:
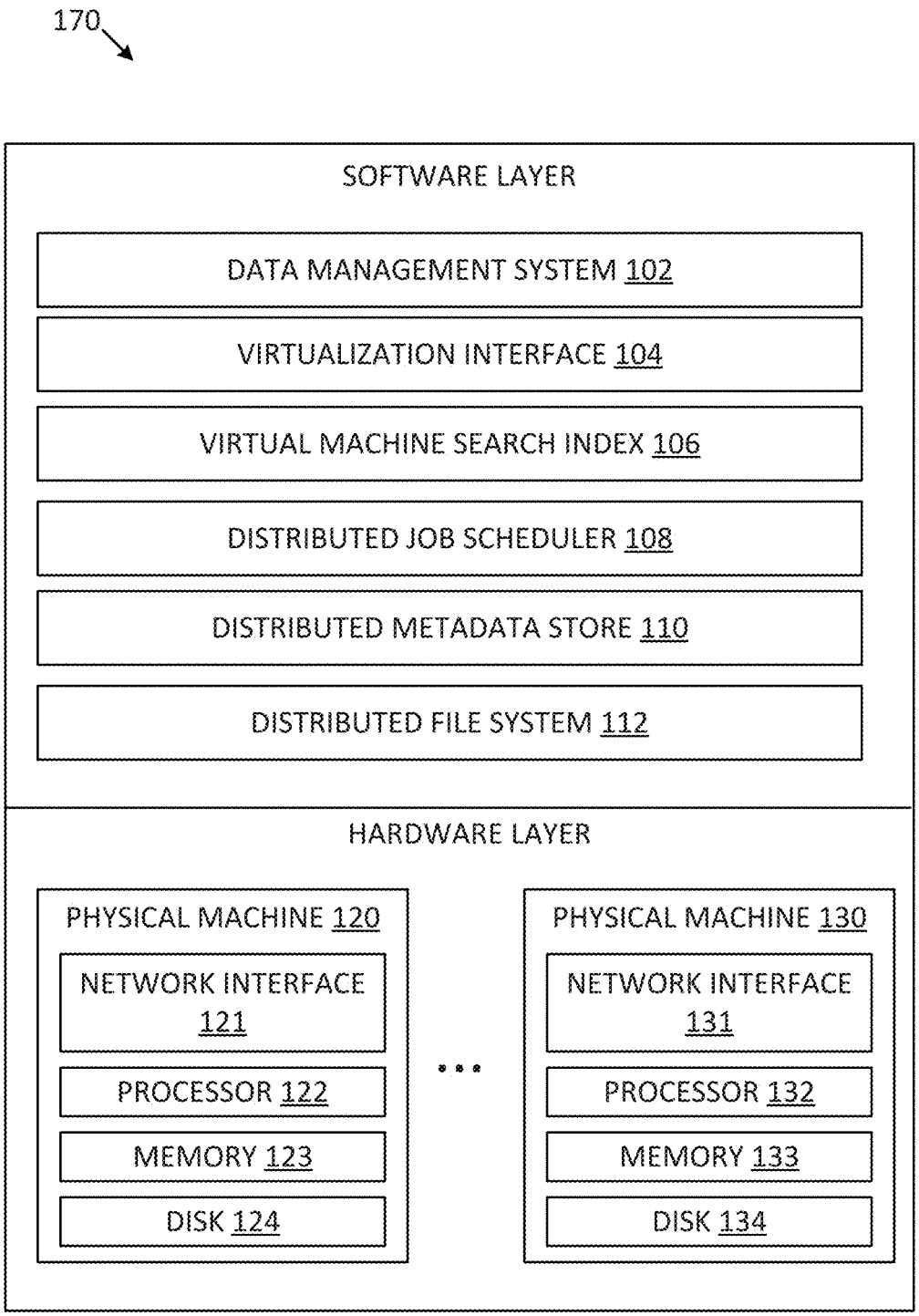
FIG. 1C depicts one embodiment of a storage appliance in the example networked computing environment of FIG. 1A.

FIG. 1C depicts one embodiment of storage appliance 170 in FIG. 1A. The storage appliance may include a plurality of physical machines that may be grouped together and presented as a single computing system. Each physical machine of the plurality of physical machines may comprise a node in a cluster (e.g., a failover cluster). In one example, the storage appliance may be positioned within a server rack within a data center. As depicted, the storage appliance 170 includes hardware-level components and software-level components. The hardware-level components include one or more physical machines, such as physical machine 120 and physical machine 130. The physical machine 120 includes a network interface 121, processor 122, memory 123, and disk 124 all in communication with each other. Processor 122 allows physical machine 120 to execute computer readable instructions stored in memory 123 to perform processes described herein. Disk 124 may include a hard disk drive and/or a solid-state drive. The physical machine 130 includes a network interface 131, processor 132, memory 133, and disk 134 all in communication with each other. Processor 132 allows physical machine 130 to execute computer readable instructions stored in memory 133 to perform processes described herein. Disk 134 may include a hard disk drive and/or a solid-state drive. In some cases, disk 134 may include a flash-based SSD or a hybrid HDD/SSD drive. In one embodiment, the storage appliance 170 may include a plurality of physical machines arranged in a cluster (e.g., eight machines in a cluster). Each of the plurality of physical machines may include a plurality of multi-core CPUs, 128 GB of RAM, a 500 GB SSD, four 4 TB HDDs, and a network interface controller.

In some embodiments, the plurality of physical machines may be used to implement a cluster-based network file server. The cluster-based network file server may neither require nor use a front-end load balancer. One issue with using a front-end load balancer to host the IP address for the cluster-based network file server and to forward requests to the nodes of the cluster-based network file server is that the front-end load balancer comprises a single point of failure for the cluster-based network file server. In some cases, the file system protocol used by a server, such as server 160 in FIG. 1A, or a hypervisor, such as hypervisor 186 in FIG. 1B, to communicate with the storage appliance 170 may not provide a failover mechanism (e.g., NFS Version 3). In the case that no failover mechanism is provided on the client-side, the hypervisor may not be able to connect to a new node within a cluster in the event that the node connected to the hypervisor fails.

In some embodiments, each node in a cluster may be connected to each other via a network and may be associated with one or more IP addresses (e.g., two different IP addresses may be assigned to each node). In one example, each node in the cluster may be assigned a permanent IP address and a floating IP address and may be accessed using either the permanent IP address or the floating IP address. In this case, a hypervisor, such as hypervisor 186 in FIG. 1B may be configured with a first floating IP address associated with a first node in the cluster. The hypervisor may connect to the cluster using the first floating IP address. In one example, the hypervisor may communicate with the cluster using the NFS Version 3 protocol. Each node in the cluster may run a Virtual Router Redundancy Protocol (VRRP) daemon. A daemon may comprise a background process. Each VRRP daemon may include a list of all floating IP addresses available within the cluster. In the event that the first node associated with the first floating IP address fails, one of the VRRP daemons may automatically assume or pick up the first floating IP address if no other VRRP daemon has already assumed the first floating IP address. Therefore, if the first node in the cluster fails or otherwise goes down, then one of the remaining VRRP daemons running on the other nodes in the cluster may assume the first floating IP address that is used by the hypervisor for communicating with the cluster.

In order to determine which of the other nodes in the cluster will assume the first floating IP address, a VRRP priority may be established. In one example, given a number (N) of nodes in a cluster from node (0) to node (N−1), for a floating IP address (i), the VRRP priority of node (j) may be (j−i) modulo N. In another example, given a number (N) of nodes in a cluster from node (0) to node (N−1), for a floating IP address (i), the VRRP priority of node (j) may be (i−j) modulo N. In these cases, node (j) will assume floating IP address (i) only if its VRRP priority is higher than that of any other node in the cluster that is alive and announcing itself on the network. Thus, if a node fails, then there may be a clear priority ordering for determining which other node in the cluster will take over the failed node's floating IP address.

In some cases, a cluster may include a plurality of nodes and each node of the plurality of nodes may be assigned a different floating IP address. In this case, a first hypervisor may be configured with a first floating IP address associated with a first node in the cluster, a second hypervisor may be configured with a second floating IP address associated with a second node in the cluster, and a third hypervisor may be configured with a third floating IP address associated with a third node in the cluster.

As depicted in FIG. 1C, the software-level components of the storage appliance 170 may include data management system 102, a virtualization interface 104, a distributed job scheduler 108, a distributed metadata store 110, a distributed file system 112, and one or more virtual machine search indexes, such as virtual machine search index 106. In one embodiment, the software-level components of the storage appliance 170 may be run using a dedicated hardware-based appliance. In another embodiment, the software-level components of the storage appliance 170 may be run from the cloud (e.g., the software-level components may be installed on a cloud service provider).

In some cases, the data storage across a plurality of nodes in a cluster (e.g., the data storage available from the one or more physical machines) may be aggregated and made available over a single file system namespace (e.g., /snapshots/). A directory for each virtual machine protected using the storage appliance 170 may be created (e.g., the directory for Virtual Machine A may be/snapshots/VM_A). Snapshots and other data associated with a virtual machine may reside within the directory for the virtual machine. In one example, snapshots of a virtual machine may be stored in subdirectories of the directory (e.g., a first snapshot of Virtual Machine A may reside in/snapshots/VM_A/s1/and a second snapshot of Virtual Machine A may reside in/snapshots/VM_A/s2/).

The distributed file system 112 may present itself as a single file system, in which as new physical machines or nodes are added to the storage appliance 170, the cluster may automatically discover the additional nodes and automatically increase the available capacity of the file system for storing files and other data. Each file stored in the distributed file system 112 may be partitioned into one or more chunks. Each of the one or more chunks may be stored within the distributed file system 112 as a separate file. The files stored within the distributed file system 112 may be replicated or mirrored over a plurality of physical machines, thereby creating a load-balanced and fault tolerant distributed file system. In one example, storage appliance 170 may include ten physical machines arranged as a failover cluster and a first file corresponding with a snapshot of a virtual machine (e.g.,/snapshots/VM_A/s1/s1.full) may be replicated and stored on three of the ten machines.

The distributed metadata store 110 may include a distributed database management system that provides high availability without a single point of failure. In one embodiment, the distributed metadata store 110 may comprise a database, such as a distributed document oriented database. The distributed metadata store 110 may be used as a distributed key value storage system. In one example, the distributed metadata store 110 may comprise a distributed NoSQL key value store database. In some cases, the distributed metadata store 110 may include a partitioned row store, in which rows are organized into tables or other collections of related data held within a structured format within the key value store database. A table (or a set of tables) may be used to store metadata information associated with one or more files stored within the distributed file system 112. The metadata information may include the name of a file, a size of the file, file permissions associated with the file, when the file was last modified, and file mapping information associated with an identification of the location of the file stored within a cluster of physical machines. In one embodiment, a new file corresponding with a snapshot of a virtual machine may be stored within the distributed file system 112 and metadata associated with the new file may be stored within the distributed metadata store 110. The distributed metadata store 110 may also be used to store a backup schedule for the virtual machine and a list of snapshots for the virtual machine that are stored using the storage appliance 170.

In some cases, the distributed metadata store 110 may be used to manage one or more versions of a virtual machine. Each version of the virtual machine may correspond with a full image snapshot of the virtual machine stored within the distributed file system 112 or an incremental snapshot of the virtual machine (e.g., a forward incremental or reverse incremental) stored within the distributed file system 112. In one embodiment, the one or more versions of the virtual machine may correspond with a plurality of files. The plurality of files may include a single full image snapshot of the virtual machine and one or more incrementals derived from the single full image snapshot. The single full image snapshot of the virtual machine may be stored using a first storage device of a first type (e.g., a HDD) and the one or more incrementals derived from the single full image snapshot may be stored using a second storage device of a second type (e.g., an SSD). In this case, only a single full image needs to be stored and each version of the virtual machine may be generated from the single full image or the single full image combined with a subset of the one or more incrementals. Furthermore, each version of the virtual machine may be generated by performing a sequential read from the first storage device (e.g., reading a single file from a HDD) to acquire the full image and, in parallel, performing one or more reads from the second storage device (e.g., performing fast random reads from an SSD) to acquire the one or more incrementals.

The distributed job scheduler 108 may be used for scheduling backup jobs that acquire and store virtual machine snapshots for one or more virtual machines over time. The distributed job scheduler 108 may follow a backup schedule to backup an entire image of a virtual machine at a particular point in time or one or more virtual disks associated with the virtual machine at the particular point in time. In one example, the backup schedule may specify that the virtual machine be backed up at a snapshot capture frequency, such as every two hours or every 24 hours. Each backup job may be associated with one or more tasks to be performed in a sequence. Each of the one or more tasks associated with a job may be run on a particular node within a cluster. In some cases, the distributed job scheduler 108 may schedule a specific job to be run on a particular node based on data stored on the particular node. For example, the distributed job scheduler 108 may schedule a virtual machine snapshot job to be run on a node in a cluster that is used to store snapshots of the virtual machine in order to reduce network congestion.

The distributed job scheduler 108 may comprise a distributed fault tolerant job scheduler, in which jobs affected by node failures are recovered and rescheduled to be run on available nodes. In one embodiment, the distributed job scheduler 108 may be fully decentralized and implemented without the existence of a master node. The distributed job scheduler 108 may run job scheduling processes on each node in a cluster or on a plurality of nodes in the cluster. In one example, the distributed job scheduler 108 may run a first set of job scheduling processes on a first node in the cluster, a second set of job scheduling processes on a second node in the cluster, and a third set of job scheduling processes on a third node in the cluster. The first set of job scheduling processes, the second set of job scheduling processes, and the third set of job scheduling processes may store information regarding jobs, schedules, and the states of jobs using a metadata store, such as distributed metadata store 110. In the event that the first node running the first set of job scheduling processes fails (e.g., due to a network failure or a physical machine failure), the states of the jobs managed by the first set of job scheduling processes may fail to be updated within a threshold period of time (e.g., a job may fail to be completed within 30 seconds or within 3 minutes from being started). In response to detecting jobs that have failed to be updated within the threshold period of time, the distributed job scheduler 108 may undo and restart the failed jobs on available nodes within the cluster.

The job scheduling processes running on at least a plurality of nodes in a cluster (e.g., on each available node in the cluster) may manage the scheduling and execution of a plurality of jobs. The job scheduling processes may include run processes for running jobs, cleanup processes for cleaning up failed tasks, and rollback processes for rolling-back or undoing any actions or tasks performed by failed jobs. In one embodiment, the job scheduling processes may detect that a particular task for a particular job has failed and in response may perform a cleanup process to clean up or remove the effects of the particular task and then perform a rollback process that processes one or more completed tasks for the particular job in reverse order to undo the effects of the one or more completed tasks. Once the particular job with the failed task has been undone, the job scheduling processes may restart the particular job on an available node in the cluster.

The distributed job scheduler 108 may manage a job in which a series of tasks associated with the job are to be performed atomically (i.e., partial execution of the series of tasks is not permitted). If the series of tasks cannot be completely executed or there is any failure that occurs to one of the series of tasks during execution (e.g., a hard disk associated with a physical machine fails or a network connection to the physical machine fails), then the state of a data management system may be returned to a state as if none of the series of tasks were ever performed. The series of tasks may correspond with an ordering of tasks for the series of tasks and the distributed job scheduler 108 may ensure that each task of the series of tasks is executed based on the ordering of tasks. Tasks that do not have dependencies with each other may be executed in parallel.

In some cases, the distributed job scheduler 108 may schedule each task of a series of tasks to be performed on a specific node in a cluster. In other cases, the distributed job scheduler 108 may schedule a first task of the series of tasks to be performed on a first node in a cluster and a second task of the series of tasks to be performed on a second node in the cluster. In these cases, the first task may have to operate on a first set of data (e.g., a first file stored in a file system) stored on the first node and the second task may have to operate on a second set of data (e.g., metadata related to the first file that is stored in a database) stored on the second node. In some embodiments, one or more tasks associated with a job may have an affinity to a specific node in a cluster. In one example, if the one or more tasks require access to a database that has been replicated on three nodes in a cluster, then the one or more tasks may be executed on one of the three nodes. In another example, if the one or more tasks require access to multiple chunks of data associated with a virtual disk that has been replicated over four nodes in a cluster, then the one or more tasks may be executed on one of the four nodes. Thus, the distributed job scheduler 108 may assign one or more tasks associated with a job to be executed on a particular node in a cluster based on the location of data required to be accessed by the one or more tasks.

In one embodiment, the distributed job scheduler 108 may manage a first job associated with capturing and storing a snapshot of a virtual machine periodically (e.g., every 30 minutes). The first job may include one or more tasks, such as communicating with a virtualized infrastructure manager, such as the virtualized infrastructure manager 199 in FIG. 1B, to create a frozen copy of the virtual machine and to transfer one or more chunks (or one or more files) associated with the frozen copy to a storage appliance, such as storage appliance 170 in FIG. 1A. The one or more tasks may also include generating metadata for the one or more chunks, storing the metadata using the distributed metadata store 110, storing the one or more chunks within the distributed file system 112, and communicating with the virtualized infrastructure manager that the virtual machine the frozen copy of the virtual machine may be unfrozen or released for a frozen state. The metadata for a first chunk of the one or more chunks may include information specifying a version of the virtual machine associated with the frozen copy, a time associated with the version (e.g., the snapshot of the virtual machine was taken at 5:30 p.m. on Jun. 29, 2024), and a file path to where the first chunk is stored within the distributed file system 112 (e.g., the first chunk is located at/snapshots/VM_B/s1/s1.chunk1). The one or more tasks may also include deduplication, compression (e.g., using a lossless data compression algorithm such as LZ4 or LZ77), decompression, encryption (e.g., using a symmetric key algorithm such as Triple DES or AES-256), and decryption related tasks.

The virtualization interface 104 may provide an interface for communicating with a virtualized infrastructure manager managing a virtualization infrastructure, such as virtualized infrastructure manager 199 in FIG. 1B, and requesting data associated with virtual machine snapshots from the virtualization infrastructure. The virtualization interface 104 may communicate with the virtualized infrastructure manager using an API for accessing the virtualized infrastructure manager (e.g., to communicate a request for a snapshot of a virtual machine). In this case, storage appliance 170 may request and receive data from a virtualized infrastructure without requiring agent software to be installed or running on virtual machines within the virtualized infrastructure. The virtualization interface 104 may request data associated with virtual blocks stored on a virtual disk of the virtual machine that have changed since a last snapshot of the virtual machine was taken or since a specified prior point in time. Therefore, in some cases, if a snapshot of a virtual machine is the first snapshot taken of the virtual machine, then a full image of the virtual machine may be transferred to the storage appliance. However, if the snapshot of the virtual machine is not the first snapshot taken of the virtual machine, then only the data blocks of the virtual machine that have changed since a prior snapshot was taken may be transferred to the storage appliance.

The virtual machine search index 106 may include a list of files that have been stored using a virtual machine and a version history for each of the files in the list. Each version of a file may be mapped to the earliest point in time snapshot of the virtual machine that includes the version of the file or to a snapshot of the virtual machine that include the version of the file (e.g., the latest point in time snapshot of the virtual machine that includes the version of the file). In one example, the virtual machine search index 106 may be used to identify a version of the virtual machine that includes a particular version of a file (e.g., a particular version of a database, a spreadsheet, or a word processing document). In some cases, each of the virtual machines that are backed up or protected using storage appliance 170 may have a corresponding virtual machine search index.

In one embodiment, as each snapshot of a virtual machine is ingested each virtual disk associated with the virtual machine is parsed in order to identify a file system type associated with the virtual disk and to extract metadata (e.g., file system metadata) for each file stored on the virtual disk. The metadata may include information for locating and retrieving each file from the virtual disk. The metadata may also include a name of a file, the size of the file, the last time at which the file was modified, and a content checksum for the file. Each file that has been added, deleted, or modified since a previous snapshot was captured may be determined using the metadata (e.g., by comparing the time at which a file was last modified with a time associated with the previous snapshot). Thus, for every file that has existed within any of the snapshots of the virtual machine, a virtual machine search index may be used to identify when the file was first created (e.g., corresponding with a first version of the file) and at what times the file was modified (e.g., corresponding with subsequent versions of the file). Each version of the file may be mapped to a particular version of the virtual machine that stores that version of the file.

In some cases, if a virtual machine includes a plurality of virtual disks, then a virtual machine search index may be generated for each virtual disk of the plurality of virtual disks. For example, a first virtual machine search index may catalog and map files located on a first virtual disk of the plurality of virtual disks and a second virtual machine search index may catalog and map files located on a second virtual disk of the plurality of virtual disks. In this case, a global file catalog or a global virtual machine search index for the virtual machine may include the first virtual machine search index and the second virtual machine search index. A global file catalog may be stored for each virtual machine backed up by a storage appliance within a file system, such as distributed file system 112 in FIG. 1C.

The data management system 102 may comprise an application running on the storage appliance that manages and stores one or more snapshots of a virtual machine. In one example, the data management system 102 may comprise a highest level layer in an integrated software stack running on the storage appliance. The integrated software stack may include the data management system 102, the virtualization interface 104, the distributed job scheduler 108, the distributed metadata store 110, and the distributed file system 112. In some cases, the integrated software stack may run on other computing devices, such as a server or computing device 154 in FIG. 1A. The data management system 102 may use the virtualization interface 104, the distributed job scheduler 108, the distributed metadata store 110, and the distributed file system 112 to manage and store one or more snapshots of a virtual machine. Each snapshot of the virtual machine may correspond with a point in time version of the virtual machine. The data management system 102 may generate and manage a list of versions for the virtual machine. Each version of the virtual machine may map to or reference one or more chunks and/or one or more files stored within the distributed file system 112. Combined together, the one or more chunks and/or the one or more files stored within the distributed file system 112 may comprise a full image of the version of the virtual machine.

In some cases, the storage appliance 170 may comprise a converged scale-out data management system that includes an integrated software stack that protects application data, enables near instant recovery of applications, and allows derivative workloads (e.g., testing, development, and analytic workloads) to use the storage appliance as a primary storage platform to read and/or modify past versions of data. In one embodiment, the data management system 102 may manage and store a plurality of point in time versions of a virtual machine, receive an instruction to restore a first version of the plurality of point in time versions of the virtual machine (e.g., to restore the virtual machine to a restore point), generate the first version in response to the instruction to restore the first version, and output the first version (e.g., transfer the first version to a primary storage system). The first version may correspond with the most recent snapshot of the virtual machine. The data management system 102 may also receive a second instruction to restore a particular version of a particular file (e.g., a word processing document or a database file), determine a second version of the plurality of point in time versions of the virtual machine that includes the particular version of the particular file, extract the particular version of the particular file from a portion of the second version of the virtual machine (e.g., extracting the particular version of the particular file without completely generating the full image of the second version of the virtual machine), and output the particular version of the particular file (e.g., by transferring the particular version of the particular file to a server). In some cases, a group of one or more files (e.g., associated with a file folder) may be restored and outputted from the storage appliance 170 without requiring a full image of a virtual machine to be generated or restored.

In another embodiment, the data management system 102 may manage and store a plurality of point in time versions of a virtual machine, receive an instruction to mount a particular version of the plurality of point in time versions, generate a mounted version of the virtual machine based on the particular version in response to the instruction to mount the particular version, output a first set of data associated with the mounted version, receive a second set of data associated with one or more modifications to the mounted version, and update the mounted version of the virtual machine based on the second set of data. In parallel, while a primary system has mounted the particular version of the virtual machine and has the ability to access and/or modify data associated with the particular version of the virtual machine, a copy of the particular version of the virtual machine (e.g., the contents of a virtual disk and configuration information associated with the particular version) and any subsequent changes to the particular version of the virtual machine may be transferred to the primary system. In some cases, a primary system may automatically failover or switch to the particular version stored on the storage appliance 170 and then automatically failback or switch back to the primary system once the particular version of the virtual machine has been transferred to the primary system. By allowing a primary system to directly mount the particular version of the virtual machine, the primary system may immediately bring up and use the particular version of the virtual machine without first restoring and transferring the particular version of the virtual machine to the primary system. In some cases, to improve system performance and to enable a non-passive storage system, the data management system 102 may generate and then store the mounted version of the virtual machine in a cache, such as a flash-based cache.

In another embodiment, the data management system 102 may manage and store a plurality of point in time versions of a virtual machine, receive an instruction to generate a derivative version of a first version of the plurality of point in time versions, generate the derivative version in response to the instruction, receive a second set of data associated with one or more modifications to the derivative version, and update the derivative version of the virtual machine based on the second set of data. By allowing a system running a derivative workload to directly mount a derivative version of a point in time version of the virtual machine and read and/or modify data associated with the derivative version, the derivative workload may be run using a backup storage system for a primary system, thereby enabling a non-passive backup system for the primary system. In one example, a new application may be installed on a derivative version of a snapshot of a virtual machine and run using the derivative version in order to test the execution of the new application prior to installing the new application within a production environment.

In some embodiments, a plurality of versions of a virtual machine may be stored as a base file associated with a complete image of the virtual machine at a particular point in time and one or more incremental files associated with forward and/or reverse incremental changes derived from the base file. The data management system 102 may patch together the base file and the one or more incremental files in order to generate a particular version of the plurality of versions by adding and/or subtracting data associated with the one or more incremental files from the base file or intermediary files derived from the base file. In some embodiments, each version of the plurality of versions of a virtual machine may correspond with a merged file. A merged file may include pointers or references to one or more files and/or one or more chunks associated with a particular version of a virtual machine. In one example, a merged file may include a first pointer or symbolic link to a base file and a second pointer or symbolic link to an incremental file associated with the particular version of the virtual machine. In some embodiments, the one or more incremental files may correspond with forward incrementals (e.g., positive deltas), reverse incrementals (e.g., negative deltas), or a combination of both forward incrementals and reverse incrementals.

Figure 2:
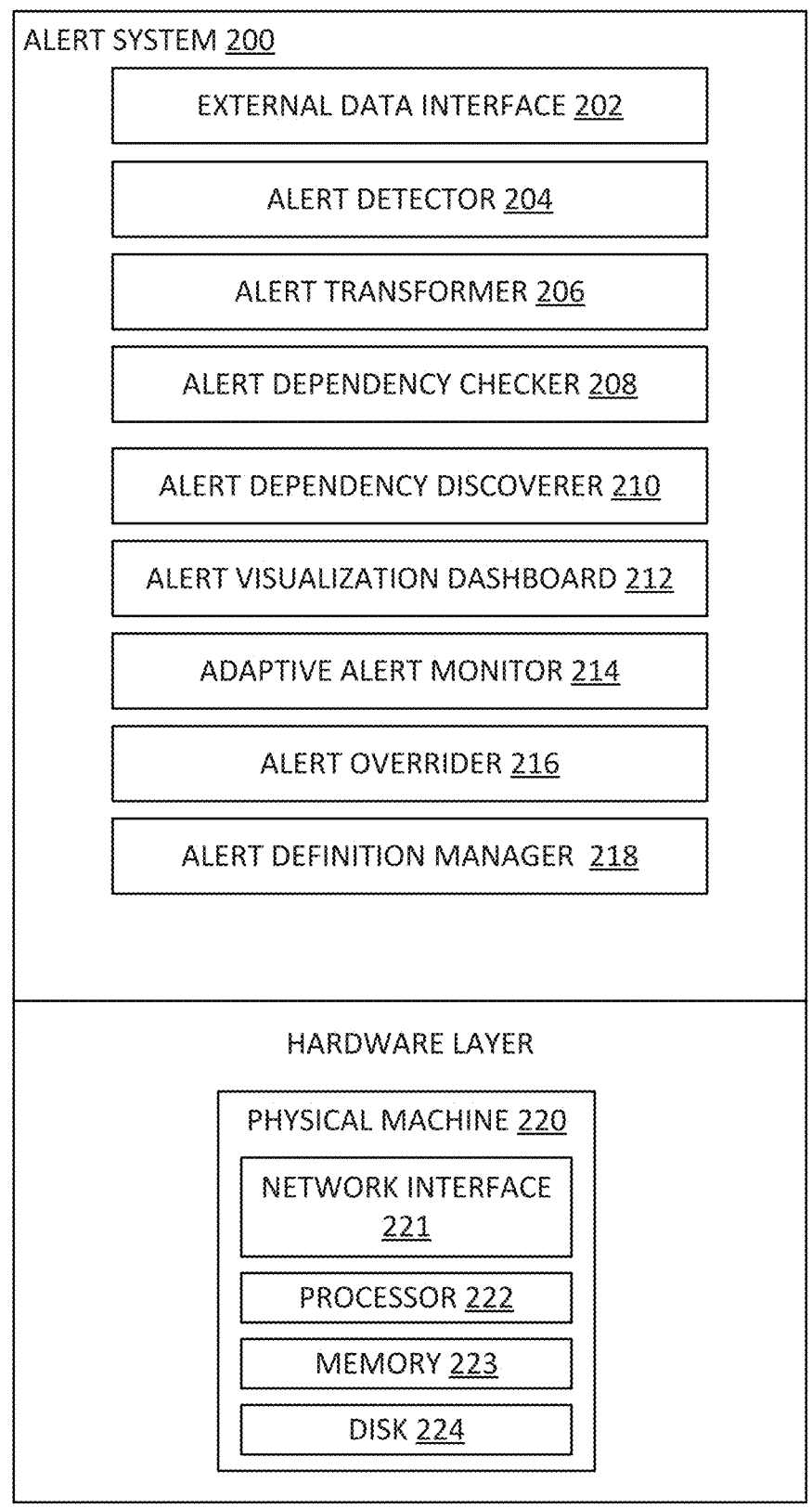
FIG. 2 is a block diagram illustrating an example alert system, in accordance with some embodiments described herein.

FIG. 2 is a block diagram illustrating an example alert system 200, in accordance with some embodiments described herein. For some embodiments, the alert system 190 is implemented similar to the alert system 200. As shown, the alert system 200 comprises an external data interface 202, an alert detector 204, an alert transformer 206, an alert dependency checker 208, an alert dependency discoverer 210, an alert visualization dashboard 212, an adaptive alert monitor 214, an alert overrider 216, and an alert definition manager 218.

Various components or modules of the alert system 200 can be implemented using hardware, software, or some combination of both. For instance, as shown, the alert system 200 comprises physical machine 220, which includes a network interface 221, processor 222, memory 223, and disk 224 all in communication with each other. Processor 222 allows physical machine 220 to execute computer readable instructions stored in memory 223 to perform processes described herein. One or more of components 202 through 218 can comprise computer readable instructions stored in memory 223 and executable by the physical machine 220 to cause operation of the alert system 200 as described herein.

The external data interface 202 accesses data provided by one or more physical or virtual machines (e.g., the server 160, forming a system, such as the storage appliance 140 or 170), which the alert system 200 can use to monitor those one or machines and to generate active alerts for those one or more machines. For some embodiments, the data comprises telemetry data for the one or more machines, which may be collected from the one or more machines using a data collection service or agent (e.g., one operating on each of the one or more machines). Telemetry data for a machine can provide information (e.g., status, measurement, errors, failures, etc.) regarding an operation, process or service performed on or by the machine. The telemetry data can comprise, for example, log data generated by a machine, such as log data generated by a process or service operating on the machine, or a metric determined for a machine, such as metric data calculated for the machine by a data collection service/agent on the machine.

For some embodiments, the data (e.g., telemetry data) collected from the one or more machines is stored in a collected data datastore, such as a database or a repository, which can be external to the alert system 200 and from which the alert system 200 can retrieve data as needed via the external data interface 202. For instance, through the external data interface 202, the alert system 200 can query the collected data datastore for telemetry data, or can directly retrieve telemetry data of interest from the collected data datastore. The portions of data (e.g., telemetry data) the alert system 200 queries the collected data datastore for, or retrieves from the collected data datastore, are associated with (e.g., relevant to the alert system 200 identifying or detecting) one or more identifiable alerts that the machine can trigger with respect to the alert system 200.

As described herein, for some embodiments, one or more identifiable alerts are defined by corresponding alert definitions, which may be stored on the alert system 200 or on an external datastore. With respect to an identifiable alert for a machine, an alert definition for that identifiable alert can describe one or more elements (e.g., attributes) the alert system 200 is searching for in the data (e.g., telemetry data) provided by the machine and when those attributes are present, the given identifiable alert is considered triggered. Accordingly, the one or more elements the alert system 200 is searching/looking for (relevant for detecting the one or more identifiable alerts) can determine what portions of data are queried for or retrieved from the collected data datastore by the alert system 200.

The alert detector 204 analyzes data (e.g., telemetry data) provided by one or more machines (e.g., physical or virtual machines), and detects whether the one or more machines have triggered one or more identifiable alerts based on analysis of the data. For some embodiments, a given identifiable alert is triggered with respect to the alert system 200 in response to the alert detector 204 detecting the presence of one or more data elements (e.g., attributes) associated with the given identifiable alert. The one or more data elements for the given identifiable alert can be identified by an alert definition for the given identifiable alert. The alert detector 204 can detect the presence of the one or more data elements by way of performing a text search (e.g., regular expression search) on the data (e.g., telemetry data) provided by the one or more machines, or by detecting a data pattern based on the data (e.g., detect an increase or decrease of a metric over a period of time). For example, with respect to an alert triggered based on log data provided by a machine, the alert detector 204 can detect whether the log-based alert has been triggered by identifying (e.g., searching for and finding) one or more specific log strings within the log data (e.g., log string specified by an alert definition for the log-based alert). With respect to an alert triggered based on metric data provided by a machine, the alert detector 204 can detect whether the metric-based alert has been triggered by detecting that a value of a metric for the machine, a time-series value for a metric, or a function of multiple time-series values for a metric (e.g., for a cluster of machines) is above or below a threshold value (e.g., threshold value specified by an alert definition for the log-based alert).

The alert transformer 206 transforms data provided by one or more machines prior to transformed data, such as time-series data. For some embodiments, the alert detector 204 analyzes the transformed data to detect whether one or more machine have triggered one or more identifiable alerts. For some embodiments, with respect to one or more identifiable alerts, the alert transformer 206 transforms machine-provided data (e.g., telemetry data) to transformed data by applying a transformation function or process, associated with the one or more identifiable alerts, to the machine-provided data. For instance, with respect to a metric-based alert based on the value of a particular metric, metric data provided by a machine can be transformed into time-series data by applying a transformation function that records a time and a data point for each time the value of the particular metric surpasses a threshold value associated with the metric-based alert. In such an instance, the data point can comprise, for example, the amount by which the value of the metric when the value surpassed the threshold value, or the amount by which the value surpasses the threshold value.

In another instance, with respect to a metric-based alert based on the value of a particular metric, metric data provided by a machine can be transformed into time-series data by applying a transformation function that reduces a series of values for the metric into a single value.

In another instance, with respect to a log-based alert that based on a particular log string, log data provided by a machine can be transformed into time-series data by applying a transformation function that records a time and a data point each time a log string is found in the log data by a regular expression. In such an instance, the data point can comprise, for example, the exact log string found or a boolean value (e.g., value of true) to represent that the log string was found.

The transformed data (e.g., time-series data) can be stored on a transformed data datastore (e.g., time-series data datastore) by the alert system 200, which can be used by the alert detector 204 to detect one or more triggered alerts, by the alert dependency checker 208 to perform alert dependency checking, by the alert dependency discoverer 210 to dynamically discover or update alert dependencies, or by the alert visualization dashboard 212 to generate a visual dashboard based on the machine-provided data. Additionally, the transformed data (e.g., time-series data) can be useful for debugging layer alert dependencies. The transformed data can be stored in the transformed data datastore in association with one or more identifiable alerts to which the stored transformed data is relevant.

The alert dependency checker 208 checks triggered alerts detected by the alert detector 204 for one or more alert dependencies, and filters the triggered alerts based on the check to generate one or more active alerts, which the alert system 200 can then output (e.g., to a dashboard via the alert visualization dashboard 212). As described herein, a given alert dependency can comprise that an alert A is dependent on at least one other alert B. An alert dependency can be described by alert dependency data that is accessible by the alert dependency checker 208. For instance, one or more alert dependencies can be stored in an alert dependency datastore, which may be external to or part of the alert system 200. The alert dependency data can comprise a direct acyclic graph (DAG) that describes one or more dependencies between two or more alerts. For example, the vertices of the DAG can correspond with identifiable alerts and the directed edges between the vertices may correspond with the dependencies. To check a dependency, the alert dependency checker 208 can traverse the DAG to determine whether an alert A is dependent on any other alerts and, if so, which alerts. Depending on the embodiment, the alert dependency data can comprise a single DAG or a plurality of DAGs (e.g., a DAG for each identifiable alert) to store one or more alert dependencies.

As described herein, an alert dependency can be dynamically discovered by the alert dependency discoverer 210 or statically defined by a user (e.g., administrator or an engineer). For some embodiments, an alert definition associated with a given identifiable alert declares one or more other identifiable alerts that the given identifiable alert depends on. The alert dependency data used by the alert dependency checker 208 can be generated based on both alert dependencies statically defined by a user (e.g., via alert definitions) and alert dependencies dynamically discovered by the alert dependency discoverer 210.

For some embodiments, for a given triggered alert detected by the alert detector 204, the alert dependency checker 208 determines (e.g., based on alert dependency data) whether the given triggered alert has any alert dependencies. If the alert dependency checker 208 determines (e.g., based on alert dependency data) that the given triggered alert is dependent on a set of other alerts, and any of those other alerts has also been determined to have been triggered (e.g., by the alert detector 204 or by the alert dependency checker 208 based on analyzing a time-series data for each of those other alerts), alert dependency checker 208 can filter out the given triggered alert, thereby preventing the triggered alert from being generated (e.g., outputted) as an active alert by the alert system 200. In doing so, the alert dependency checker 208 can reduce the alert noise being generated (e.g., outputted) by the alert system 200. Alternatively, if the alert dependency checker 208 determines (e.g., based on alert dependency data) that the given triggered alert is dependent on a set of other alerts, but none of those other alerts has been determined to have been triggered (e.g., by the alert detector 204 or by the alert dependency checker 208), the alert dependency checker 208 can permit the given triggered alert to be generated (e.g., outputted) as an active alert by the alert system 200. Alternatively, if the alert dependency checker 208 determines (e.g., based on alert dependency data) that the given triggered alert is not dependent on any other alerts, the alert system 200 permits the given triggered alert to be generated (e.g., outputted) as an active alert.

The one or more active alerts generated by the alert dependency checker 208 can be stored in an active alert datastore, from which other processes can access the active alerts for further processing, such as generation of an alert dashboard by the alert visualization dashboard 212, generation of development/support/troubleshooting tickets, or processing by a testing system.

Depending on the embodiment, the one or more active alerts generated by the alert dependency checker 208 can initially be stored to an active alert datastore, and then eventually stored (e.g., archived or moved) to a historical active alert datastore (e.g., after a certain period of time has passed).

The alert dependency discoverer 210 discovers (or finds) a new alert dependency between two or more identifiable alerts based on historical active alerts, current active alerts, or some combination of both. To discover a new alert dependency of a particular active alert A1 (e.g., a past or present active alert) on one or more other active alerts (e.g., past active alerts), the alert dependency discoverer 210 can first select a set of candidate active alerts, relative to the particular identifiable alert A1, to analyze for the new alert dependency. Depending on the embodiment, the set of candidate active alerts can be selected from historical active alerts, current active alerts, or some combination of both. The criterion for selecting the set of candidate active alerts, relative to the particular active alert A1, can comprise time-based criterion. For instance, a time-based criterion can define a time window (e.g., 3 to 5 second) that precedes each occurrence of the particular active alert A1, and any other active alerts that occurred within that time window can be selected as candidate active alert.

Next, for each candidate active alert in the set of candidate active alerts, the alert dependency discoverer 210 can generate a score for the candidate active alert based on a metric associated with the candidate active alert and the particular active alert A1. For instance, for a given candidate active alert A2, the score can be generated based on a metric that measures the percentage of time the given candidate active alert A2 precedes the particular active alert A1. In another instance, stochastics, the alert dependency discoverer 210 can utilize stochastics to generate the score for the given candidate active alert A2 relative to the particular active alert A1. Depending on the embodiment, the metric used to generate the score can be determined (e.g., calculated) based on historical active alert data, active alert data, or both.

Subsequently, based on the score generated for the given candidate active alert A2, the alert dependency discoverer 210 can determine whether the particular active alert A1 is dependent upon the given candidate active alert A2. For instance, in response to the score for the given candidate active alert A2 indicating that the given candidate active alert A2 precedes the particular active alert A1 100% of the time, the alert dependency discoverer 210 can determine that the particular active alert A1 is dependent upon the given candidate active alert A2. In response to this determination, the alert dependency discoverer 210 can store (or otherwise update) alert dependency data to represent that the particular active alert A1 is dependent upon the given candidate active alert A2.

The alert visualization dashboard 212 generate a visual dashboard (e.g., GUI dashboard) based on a set of active alerts generated by the alert system 200 (e.g., via the alert dependency checker 208). For instance, a visual dashboard generated by the alert visualization dashboard 212 can convey to a user a current alert state of one or more machines being monitored by the alert system 200. In another instance, a visual dashboard generated by the alert visualization dashboard 212 can assist a user in visually identifying one or more alert dependencies (e.g., as illustrated with respect to FIG. 7). In another instance, the alert visualization dashboard 212 can generate a visual dashboard based on transformed data (e.g., time-series data) generated by the alert transformer 206, such as time-series data on a metric on a machine.

The adaptive alert monitor 214 can cause the alert system 200 to periodically monitor one or more machines based on a monitoring frequency (e.g., time interval between alert scans). For some embodiments, the adaptive alert monitor 214 generates an alert state based on a set of active alerts for the one or more machines, and adjusts the monitoring frequency based on an alert state. Depending on the embodiment, the monitoring frequency for the adaptive alert monitor 214 can be different for different identifiable alerts, or different for different machines. For example, the adaptive alert monitor 214 can decrease the monitor frequency based on the alert state indicating that the alert system 200 that a bad node alert is active (and a notification policy for sequence alert can be changed to notify a user immediately).

For some embodiments, the adaptive alert monitor 214 generates an alert state based on a set of active alerts for the one or more machines, and adjusts one or more parameters (e.g., increase or decrease threshold values associated with metric-based identifiable alerts) used by the alert transformer 206 to transform data provided by a machine to transformed data. In doing so, the adaptive alert monitor 214 can increase or decrease the sensitivity of the alert system 200 in detecting a set of triggered alerts. For example, the adaptive alert monitor 214 can increase a set of threshold values based on the alert state indicating that the alert system 200 is generating a lot of alert noise.

Adjustment (e.g., of the monitoring frequency or a set of threshold values) by the adaptive alert monitor 214 can be performed according to one or more policies. Depending on the embodiment, the alert state can describe a set of active alerts a machine with respect to (e.g., in terms of) a set of identifiable alerts for the machine. For instance, the alert state can comprise a vector (e.g., boolean vector) representing a plurality of statuses (e.g., true or false) corresponding to the set of identifiable alerts for the machine (e.g., true if the identifiable alert is active, and false otherwise).

The adaptive alert monitor 214 can also generate a health score for a machine based on an alert state of the machine. For instance, each identifiable alert can be assigned a weight, and the adaptive alert monitor 214 can apply the weights to the alert state to calculate a health score.

The alert overrider 216 can enable a user to temporarily override one or more threshold values used by the alert transformer 206 to transform machine-provided data to transformed data as described herein. Additionally, the alert overrider 216 can temporarily override a monitoring frequency used by the adaptive alert monitor 214. For instance, if one or more machines are exhibiting issues, a user can use the alert overrider 216 to temporarily decrease one or more threshold values, increase a monitoring frequency, or both, which can enable the user to better troubleshoot issues with respect to the one or more machines.

The alert definition manager 218 manages one or more alert definitions for the alert system 200. Depending on the embodiment, the alert definition manager 218 can assist a user in creating a new alert definition by sampling existing alerts. Additionally, the alert definition manager 218 may enable a user to create a new alert definition based on an alert template into which a user enters data into a set of fields. An alert template can assist the user in creating, for example, common types of metric or log-based alerts based on user-entered fields.

Figure 3:
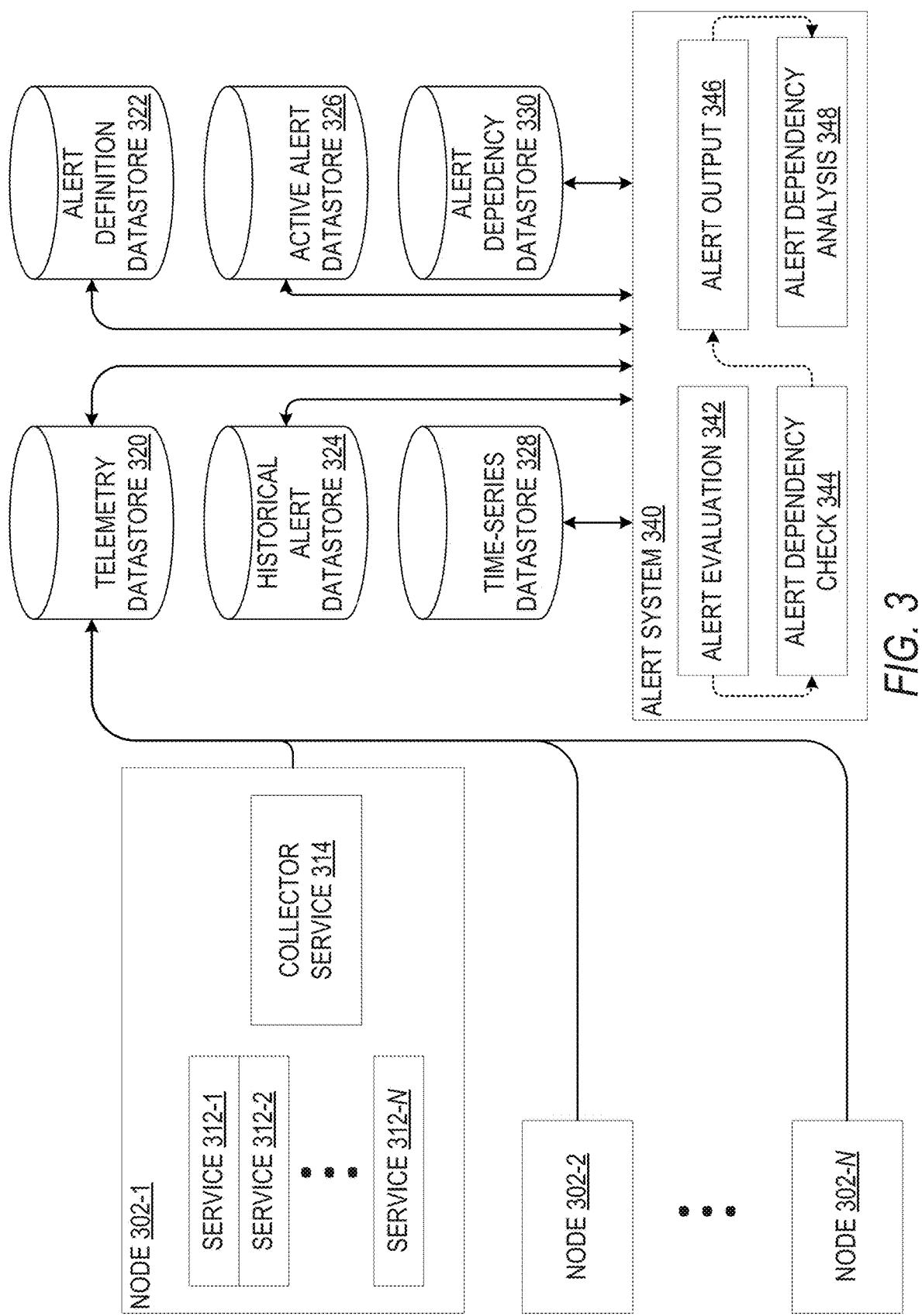
FIG. 3 is a block diagram illustrating an example alert system operating with example nodes, in accordance with some embodiments described herein.

FIG. 3 is a block diagram illustrating an example alert system 340 operating with example nodes 302-1 through 302-N, in accordance with some embodiments described herein. One or more of the example nodes 302-1 through 302-N can represent a machine (e.g., system) being monitored by the alert system 340. As shown, each of the nodes 302-1 through 302-N provides telemetry data to the alert system 340 via a telemetry datastore 320. As illustrated with respect node 302-1, one or more of the nodes 302 can each be operating one or more services 312 and a collector service 314, which can collect telemetry data at its respective node and provide (e.g., transmit or stream) the telemetry data to the telemetry datastore 320.

During operation, the alert system 340 can monitor for one or more identifiable alerts defined by corresponding alert definitions stored on an alert definition datastore 322. In particular, based on alert definitions stored on the alert definition datastore 322, an alert evaluation 342 component of the alert system 340 can evaluate the telemetry data from the telemetry datastore 320 to detect whether one or more identifiable alerts have been triggered by one or more of the nodes 302. The telemetry data of interest to the alert evaluation 342 can be obtained based on one or more queries, to the telemetry datastore 320, that correspond to one or more identifiable alerts being monitored for by the alert system 340.

To evaluate the data, the alert evaluation 342 may transform some or all of the telemetry data to time-series data, store the time-series data to the time-series datastore 328, and then evaluate the stored time-series data to detect whether one or more identifiable alerts have been triggered for one or more of the nodes 302. The alert evaluation 342 may transform some or all of the telemetry data to time-series data based on alert definitions (from the alert definition datastore 322) for the identifiable alerts being monitored for by the alert system 340.

Based on one or more alert dependencies stored on an alert dependency datastore 330, an alert dependency check 344 component can perform one or more alert dependency checks on the one or more triggered alerts detected by the alert evaluation 342. In doing so, the alert dependency check 344 can filter the one or more triggered alerts to generate a set of active alerts for one or more of the nodes 302. An alert output 346 component can output the set of active alerts, and can store the set of active alerts to an active alert datastore 326. Eventually (e.g., after a certain time period), the set of active alerts stored on the active alert datastore 326 can be stored (e.g., archived) to an historical alert datastore 324. An alert dependency analysis 348 component can analyze active alerts stored on the active alert datastore 326, the historical alert datastore 324, or both, and identify a new alert dependency between two or more identifiable alerts.

Figure 4:
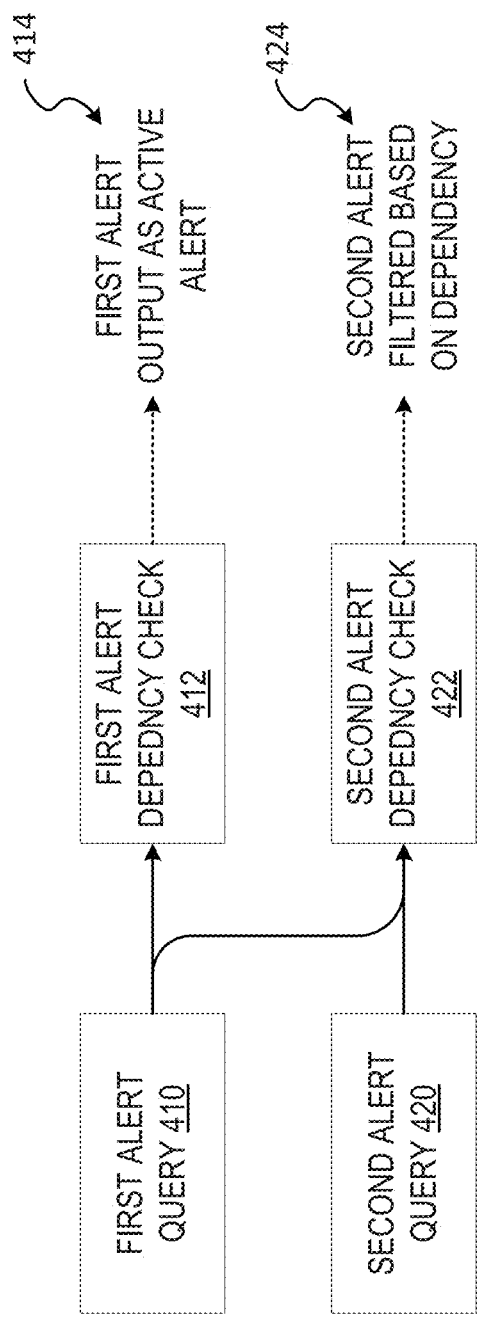
FIG. 4 is a block diagram illustrating example alert dependency checks being performed, in accordance with some embodiments described herein.

FIG. 4 is a block diagram illustrating example alert dependency checks being performed, in accordance with some embodiments described herein. As shown, a first alert query 410 is executed on telemetry data to determine whether a first alert has been triggered, and a second alert query 420 is executed on telemetry data to determine whether a second alert has been triggered. In response to the first alert being triggered, a first alert dependency check 412 is performed and, based on the result of the first alert dependency check 412, a first alert is output as an active alert at 414. In response to the first alert being triggered and the second alert being triggered, a second alert dependency check 422 is performed and, based on the result of the second alert dependency check 422, a second alert is output as an active alert at 424.

Figure 5:
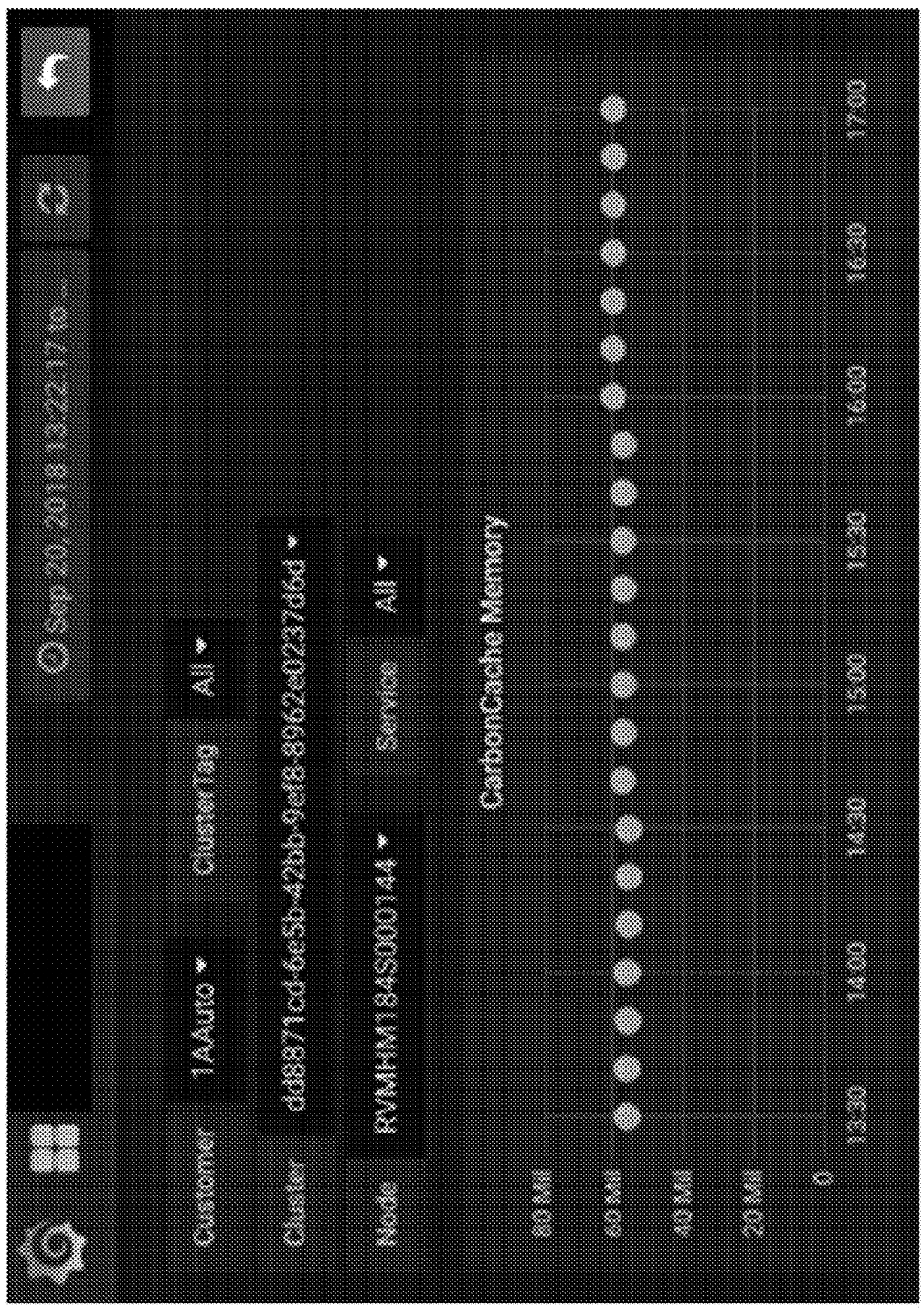
FIGS. 5 and 6 illustrate graphical user interfaces displaying example metrics that can be used by an example alert system, in accordance with some embodiments described herein.
Figure 6:
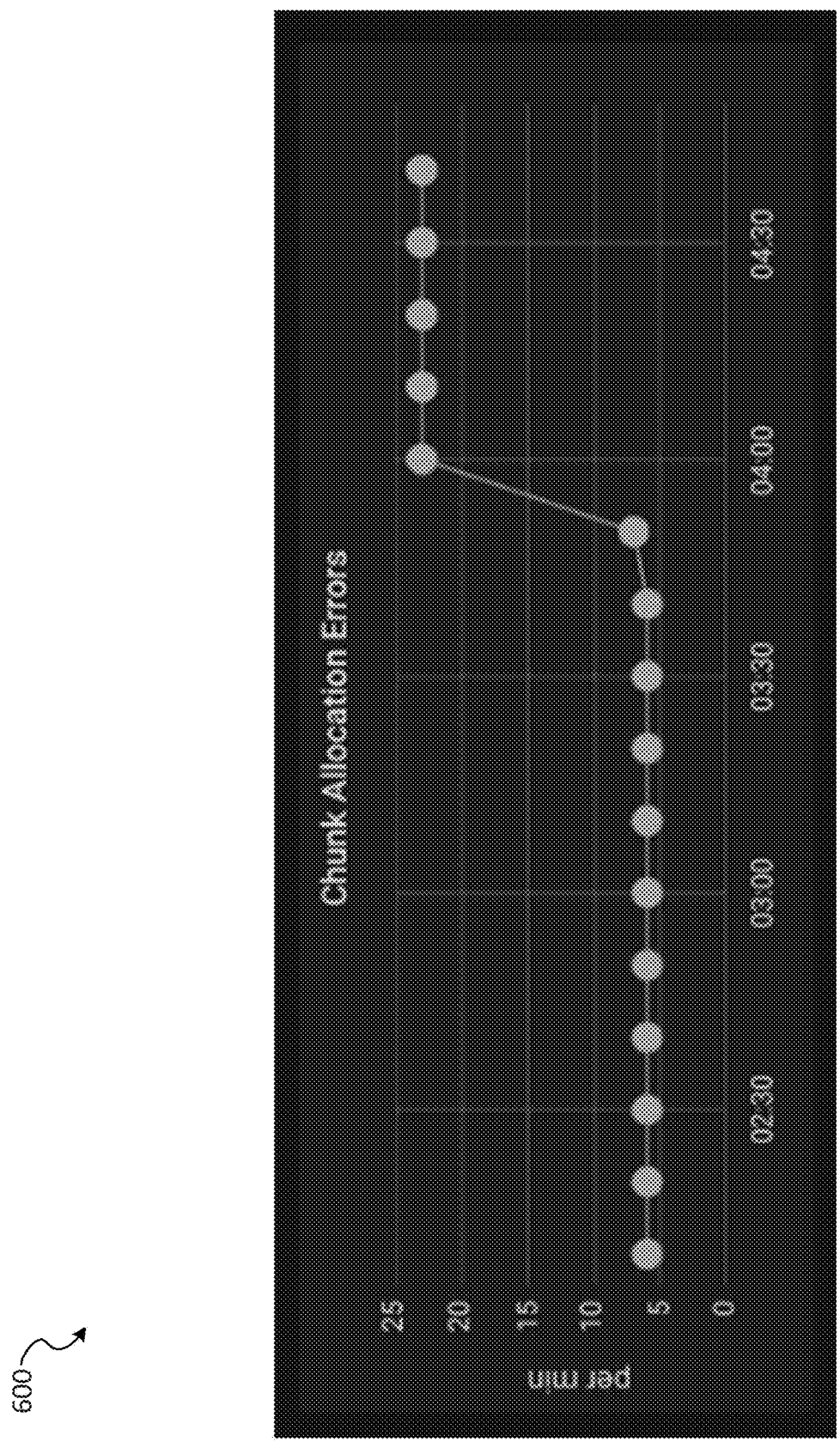

FIGS. 5 and 6 is are block diagrams illustrating example metrics that can be used by an example alert system, in accordance with some embodiments described herein. In particular, FIG. 5 illustrates a GUI dashboard 500 (e.g., generated by the alert visualization dashboard 212) that depicts time-series data points for a cache memory metric determined for a particular node of a particular node cluster. The time-series data points for the cache memory metric may be used by an alert system (e.g., 200 or 340) to generate, for example, a metric-based alert (e.g., "CacheMemoryHigh").

FIG. 6 illustrates a visual dashboard 600 (e.g., generated by the alert visualization dashboard 212) that depicts time-series data points for a data chunk allocation error metric for one or more nodes. The time-series data points for the cache memory metric may be used by an alert system (e.g., 200 or 340) to generate, for example, a metric-based alert (e.g., "ChunkAllocationErrorAlert") when the metric increases.

Figure 7:
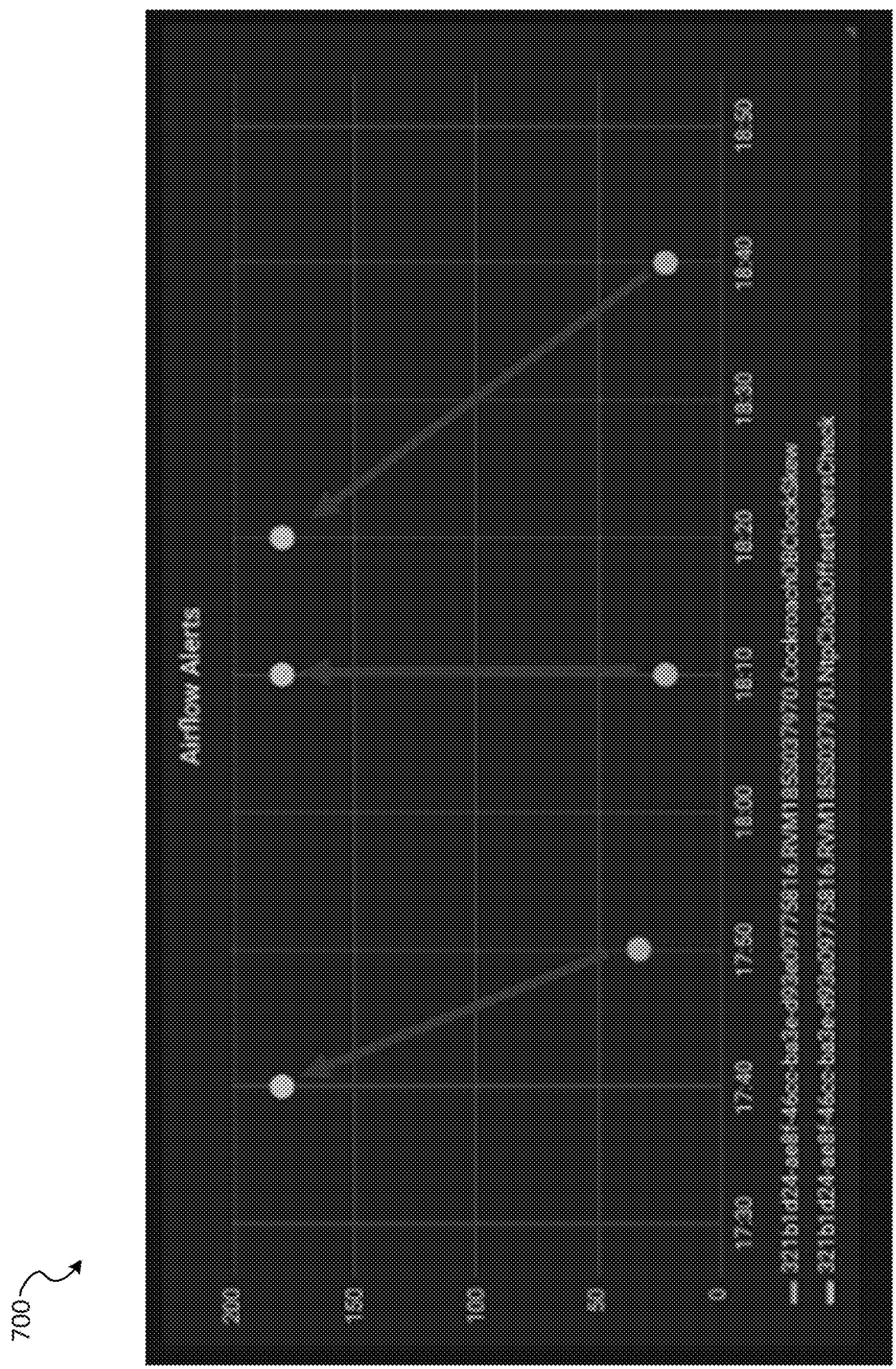
FIG. 7 illustrates a graphical user interface displaying an example metric that could be used by an example alert system, in accordance with some embodiments described herein.

FIG. 7 illustrates a visual dashboard 700 (e.g., generated by the alert visualization dashboard 212) that depicts time-series data points for a database clock skew metric and a Network Time Protocol (NTP) clock peer offset metric for one or more nodes. The combined visualization of the time-series data points for the database clock skew metric and the NTP clock skew metric can enable a user to visually recognize that a metric-based alert triggered on the NTP clock skew metric can be dependent on a metric-based alert triggered on the database clock skew metric.

FIGS. 8 through 11 are flowcharts illustrating example methods of an alert system, in accordance with some embodiments. It will be understood that example methods described herein may be performed by one or more machines (e.g., physical or virtual machines), such as a computing device executing instructions associated with an alert system described herein with respect to some embodiments. Additionally, example methods described herein may be implemented in the form of executable instructions stored on a computer-readable medium or in the form of electronic circuitry. For instance, the operations of a method 800 of FIG. 8 may be represented by executable instructions that, when executed by a processor of a machine (e.g., physical machine 220), cause the computing device to perform the method 800. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel.

Figure 8:
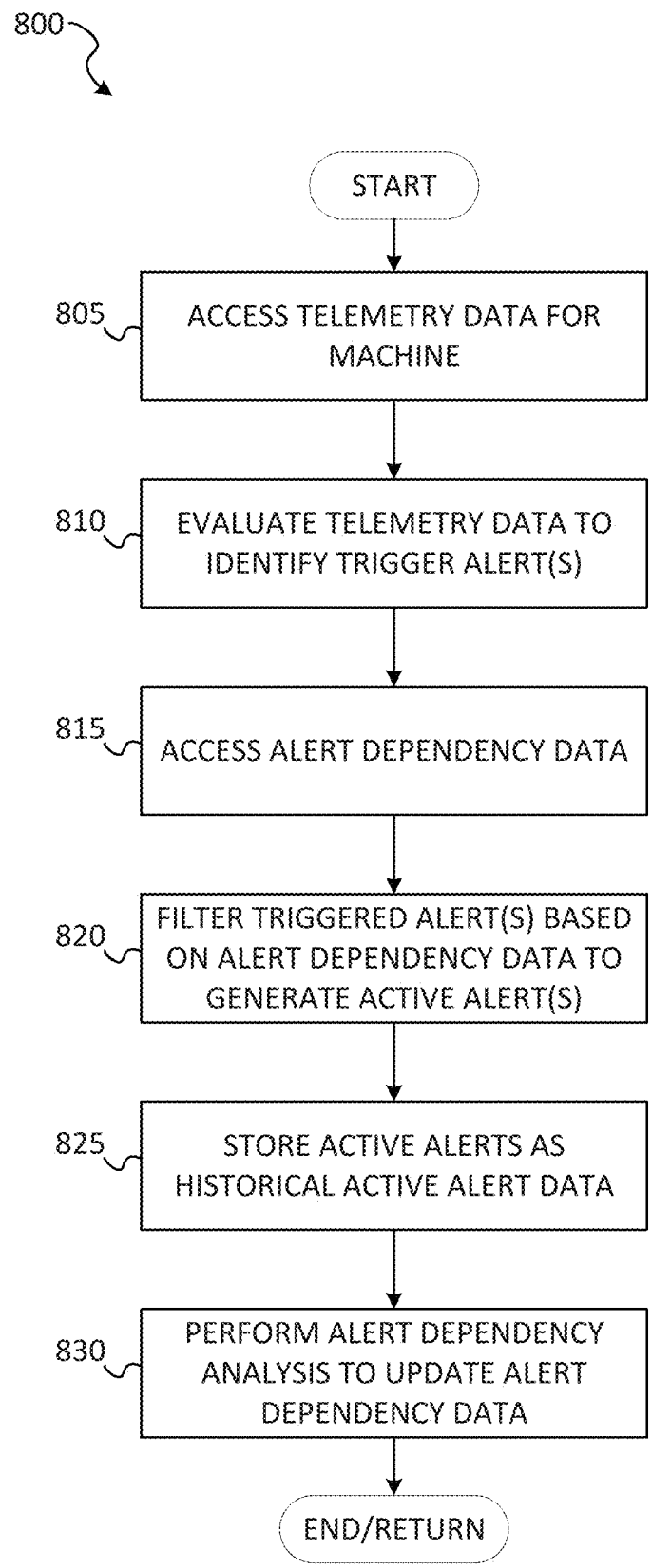
FIGS. 8 through 11 are flowcharts illustrating example methods of an alert system, in accordance with some embodiments.

Referring now to FIG. 8, the flowchart illustrates the example method 800 for active alerts and alert dependencies, in accordance with some embodiments. The method 800 as illustrated begins with operation 805 accessing telemetry data associated with a machine being monitored for triggered alerts.

The method 800 continues with operation 810 evaluating the telemetry data (accessed at operation 802) to identify a set of triggered alerts triggered by the machine. For some embodiments, the alert system obtains (e.g., by direct access or search query), from the telemetry data, alert data for a set of identifiable alerts, and generates time-series alert data based on the alert data to identify the set of triggered alerts. In particular, the time-series data can be generated by recording a time for each time a given metric, associated with a given identifiable alert described in the alert data, surpasses a threshold value. Additionally, the time-series data can be generated by recording an amount by which the given metric surpasses the threshold value each time the given metric surpasses a threshold value. Evaluating the telemetry data can comprise performing a set of searches with respect to the telemetry data, where the set of searches corresponds to a set of identifiable alerts.

The method 800 continues with operation 815 accessing alert dependency data that describes a set of dependencies between a plurality of alerts.

The method 800 continues with operation 820 filtering the set of triggered alerts based on the alert dependency data to generate a set of active alerts. For some embodiments, filtering the set of triggered alerts comprises determining, based on the alert dependency data, whether a first triggered alert in the set of triggered alerts is dependent upon any other triggered alert in the set of triggered alerts. In response to determining that the first triggered alert is dependent upon a second triggered alert in the set of triggered alerts, the alert system can generate the set of active alerts to exclude the first triggered alert. Alternatively, in response to determining that the first triggered alert is not dependent upon any other triggered alert in the set of triggered alerts, the alert system can generate the set of active alerts to include the first triggered alert.

The method 800 continues with operation 825 storing active alerts as historical active alert data. For instance, the active alerts can be stored (e.g., archived) as historical active alert data after a certain period of time has passed.

The method 800 continues with operation 830 performing alert dependency analysis, based on the set of active alerts, historical active alert data, or both, to update the alert dependency data. As described herein, alert dependency analysis can be performed by correlating two or more active alerts to discover one or more new alert dependencies.

Figure 9:
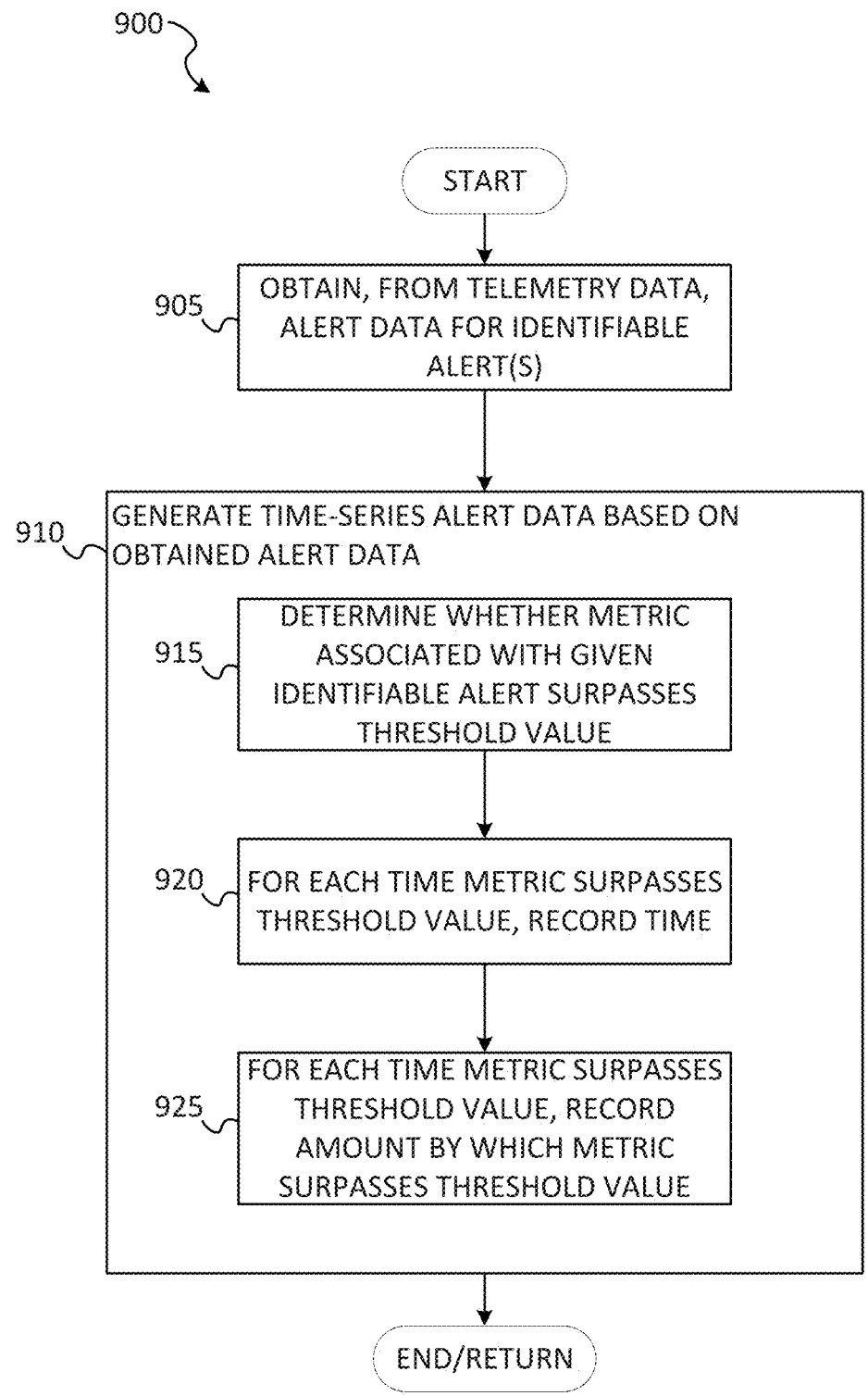

Referring now to FIG. 9, the flowchart illustrates the example method 900 for generating time-series alert data, in accordance with some embodiments. The method 900 as illustrated begins with operation 905 obtaining, from telemetry data, alert data relevant for detecting whether one or more identifiable alerts have been triggered. The method 900 continues with operation 910 generating time-series alert data, with respect to a given identifiable alert, based on the alert data obtained at operation 905. As shown, the operation 910 begins with operation 915 determining whether a metric associated with the given identifiable alert surpasses a threshold value associated with the given identifiable alert. The operation 910 then continues with operation 920 recording the time for each time the metric surpasses the threshold value. The operation 910 then continues with operation 925 recording amount by which metric surpasses the threshold value each time the metric surpasses the threshold value. For some embodiments, the recordings of the times by operation 920 and the amounts by operation 925 can result in data points that are included in the time-series alert data.

Figure 10:
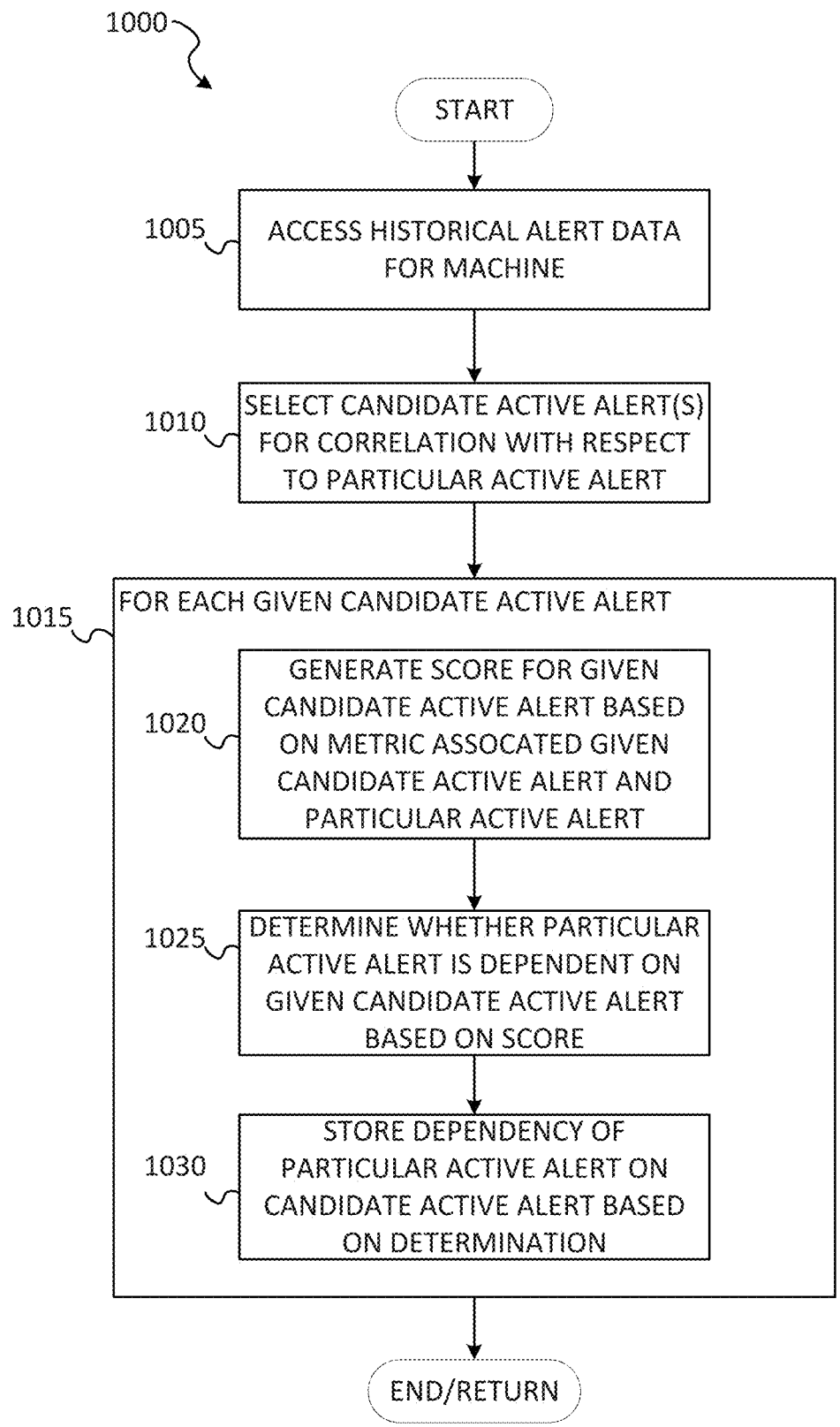

Referring now to FIG. 10, the flowchart illustrates the example method 1000 for discovery of alert dependencies, in accordance with some embodiments. The method 1000 as illustrated begins with operation 1005 accessing historical active alert data describing previous occurrences of a plurality of active alerts for a machine.

The method 1000 continues with operation 1010 selecting a set of candidate active alerts for correlation with respect to a particular active alert in the plurality of active alerts. The set of candidate active alerts can be selected from the plurality of active alerts described by the historical active alert data. For instance, the selection can comprise selecting the set of candidate active alerts, from the historical active alert data, based on a time criterion defined with respect to the particular active alert. For instance, the time criterion can define a time window (e.g., alerts that happen in the previous time duration of 3-5 seconds are targets) preceding the particular active alert.

For each given candidate active alert in the set of candidate active alerts, the method 1000 continues with operations 1020 through 1030. At operation 1020, a score is generated for the given candidate active alert based on a metric associated with the given candidate active alert and the particular active alert. The metric associated with the candidate active alert and the particular active alert can comprise a value representing an amount (e.g., percentage) of time the candidate active alert precedes the particular active alert.

At operation 1025, a determination is made whether the particular active alert is dependent on the given candidate active alert based on the score generated for the given candidate active alert. For instance, the alert system determines that the particular active alert is dependent on the candidate active alert in response to the score surpassing a score threshold. At operation 1030, a dependency of the particular active alert on the candidate active alert is stored in response to determining (at operation 1025) that the particular active alert depends on the candidate active alert based on the score.

Figure 11:
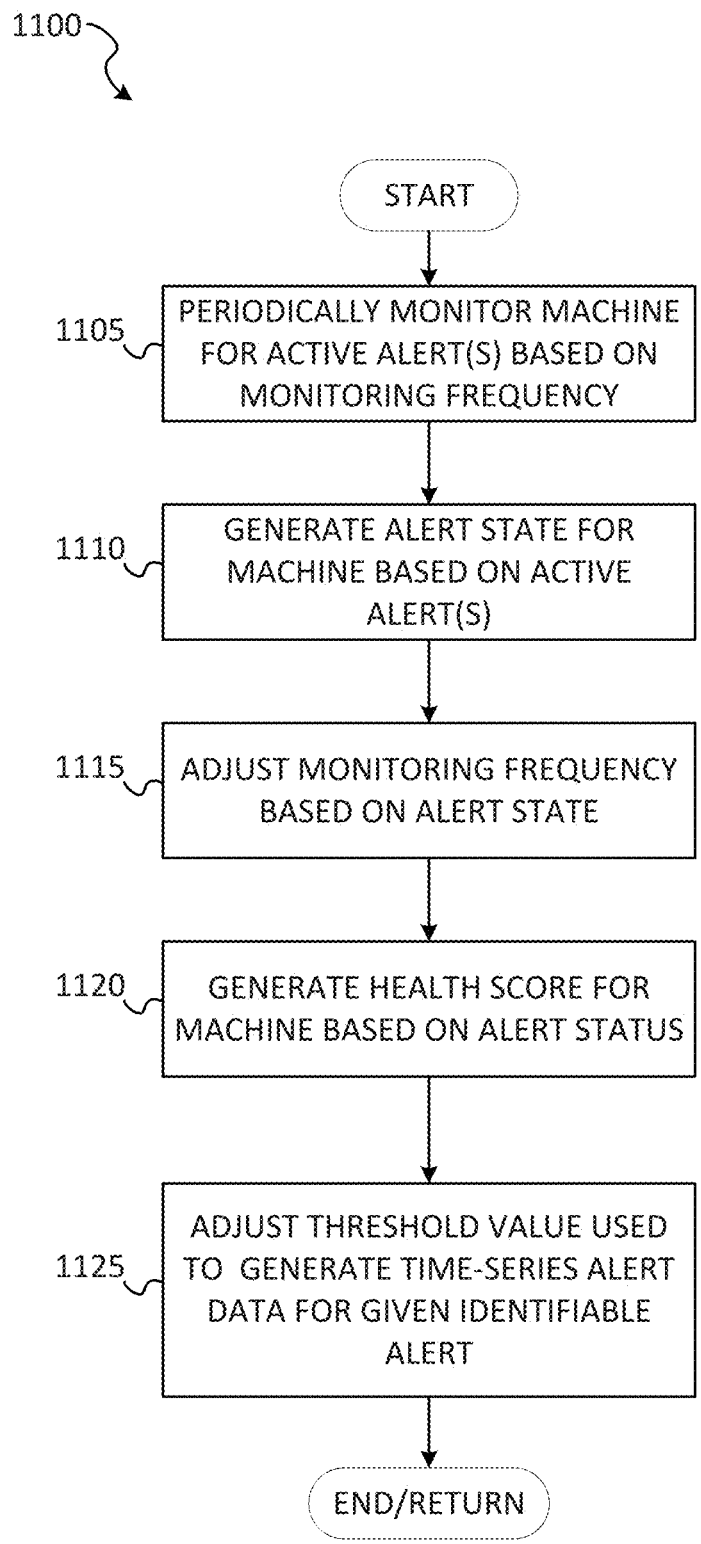

Referring now to FIG. 11, the flowchart illustrates the example method 1100 for adaptive alert monitoring, in accordance with some embodiments. The method 1100 as illustrated begins with operation 1105 periodically monitoring a machine for a set of active alerts based on a monitoring frequency. For some embodiments, periodically monitoring the machine for the set of active alerts based on the monitoring frequency comprises: evaluating telemetry data to identify a set of triggered alerts triggered by the machine; accessing alert dependency data that describes a set of dependencies between a plurality of alerts; and filtering the set of triggered alerts based on the alert dependency data to generate the set of active alerts.

The method 1100 continues with operation 1110 generating an alert state for the machine based on the set of active alerts, where the alert state describes the set of active alerts with respect to a set of identifiable alerts for the machine. The alert state can comprise a vector representing a plurality of statuses corresponding to the set of identifiable alerts for the machine, where each status of the plurality of statuses can comprises a value of on or off.

The method 1100 continues with operation 1115 adjusting the monitoring frequency based on the alert state. The adjusting of the monitoring frequency based on the alert state can comprise determining whether the alert state represents a change in comparison to a prior determined alert state, and adjusting the monitoring frequency based on the determining of whether the alert state represents the change. For instance, adjusting the monitoring frequency based on the determining whether the alert state represents the change can comprise increasing the monitoring frequency in response to the change indicating an increase in active alerts. Alternatively, the adjusting the monitoring frequency based on the determining of whether the alert state represents the change can comprise decreasing the monitoring frequency in response to the change indicating a decrease in active alerts.

The method 1100 continues with operation 1120 generating a health score for the machine based on the alert state generated at operation 1110. The health score can be generated, for example, based on applying a set of weights to the alert state and, further, calculating a dot product on the result.

The method 1100 continues with operation 1125 adjusting a threshold value based on the alert state. As described herein, the threshold value adjusted by operation 1125 can be one used to transform telemetry data to transformed data, which can be evaluated to detect whether one or more identifiable alerts have been triggered.

Figure 12:
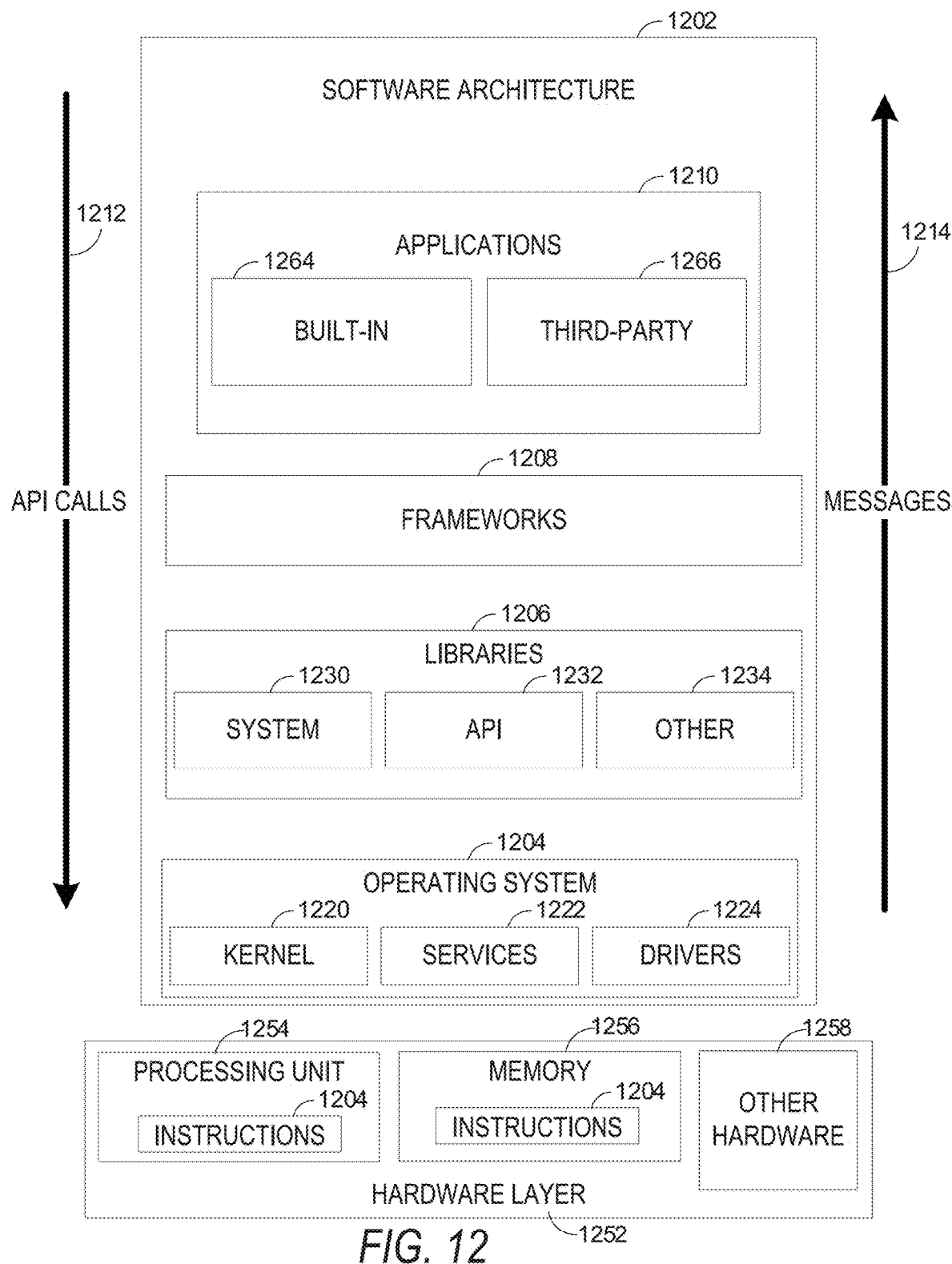
FIG. 12 is a block diagram illustrating an example architecture of software, that can be used to implement various embodiments described herein.

FIG. 12 is a block diagram 1200 illustrating an example architecture of software 1202 that can be used to implement various embodiments described herein. FIG. 12 is merely a non-limiting example of a software architecture, and it will be appreciated that many other architectures can be implemented to facilitate the functionality described herein. In various embodiments, the software 1202 is implemented by hardware such as a machine 1300 of FIG. 13 that includes processors 1310, memory 1330, and I/O components 1350. In this example architecture, the software 1202 can be conceptualized as a stack of layers where each layer may provide a particular functionality. For example, the software 1202 includes layers such as an operating system 1204, libraries 1206, frameworks 1208, and applications 1210. Operationally, the applications 1210 invoke application programming interface (API) calls 1212 through the software stack and receive messages 1214 in response to the API calls 1212, consistent with some embodiments.

In various implementations, the operating system 1204 manages hardware resources and provides common services. The operating system 1204 includes, for example, a kernel 1220, services 1222, and drivers 1224. The kernel 1220 acts as an abstraction layer between the hardware and the other software layers, consistent with some embodiments. For example, the kernel 1220 provides memory management, processor management (e.g., scheduling), component management, networking, and security settings, among other functionality. The services 1222 can provide other common services for the other software layers. The drivers 1224 are responsible for controlling or interfacing with the underlying hardware, according to some embodiments. For instance, the drivers 1224 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 1206 provide a low-level common infrastructure utilized by the applications 1210. The libraries 1206 can include system libraries 1230 (e.g., C standard library) that can provide functions such as memory allocation functions, string manipulation functions, mathematic functions, and the like. In addition, the libraries

1206 can include API libraries 1232 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1206 can also include a wide variety of other libraries 1234 to provide many other APIs to the applications 1210.

The frameworks 1208 provide a high-level common infrastructure that can be utilized by the applications 1210, according to some embodiments. For example, the frameworks 1208 provide various graphic user interface (GUI) functions, high-level resource management, high-level location services, and so forth. The frameworks 1208 can provide a broad spectrum of other APIs that can be utilized by the applications 1210, some of which may be specific to a particular operating system or platform.

In some embodiments, the applications 1210 include a built-in application 1264 and a broad assortment of other applications such as a third-party application 1266. According to some embodiments, the applications 1210 are programs that execute functions defined in the programs. Various programming languages can be employed to create one or more of the applications 1210, structured in a variety of manners, such as object-oriented programming languages (e.g., Objective-C, Java, or C++) or procedural programming languages (e.g., C or assembly language). In a specific example, the third-party application 1266 (e.g., an application developed using the ANDROID™ or IOS™ software development kit (SDK) by an entity other than the vendor of the particular platform) may be mobile software running on a mobile operating system such as IOS™, ANDROID™ WINDOWS® Phone, or another mobile operating system. In this example, the third-party application 1266 can invoke the API calls 1212 provided by the operating system 1204 to facilitate functionality described herein.

Figure 13:
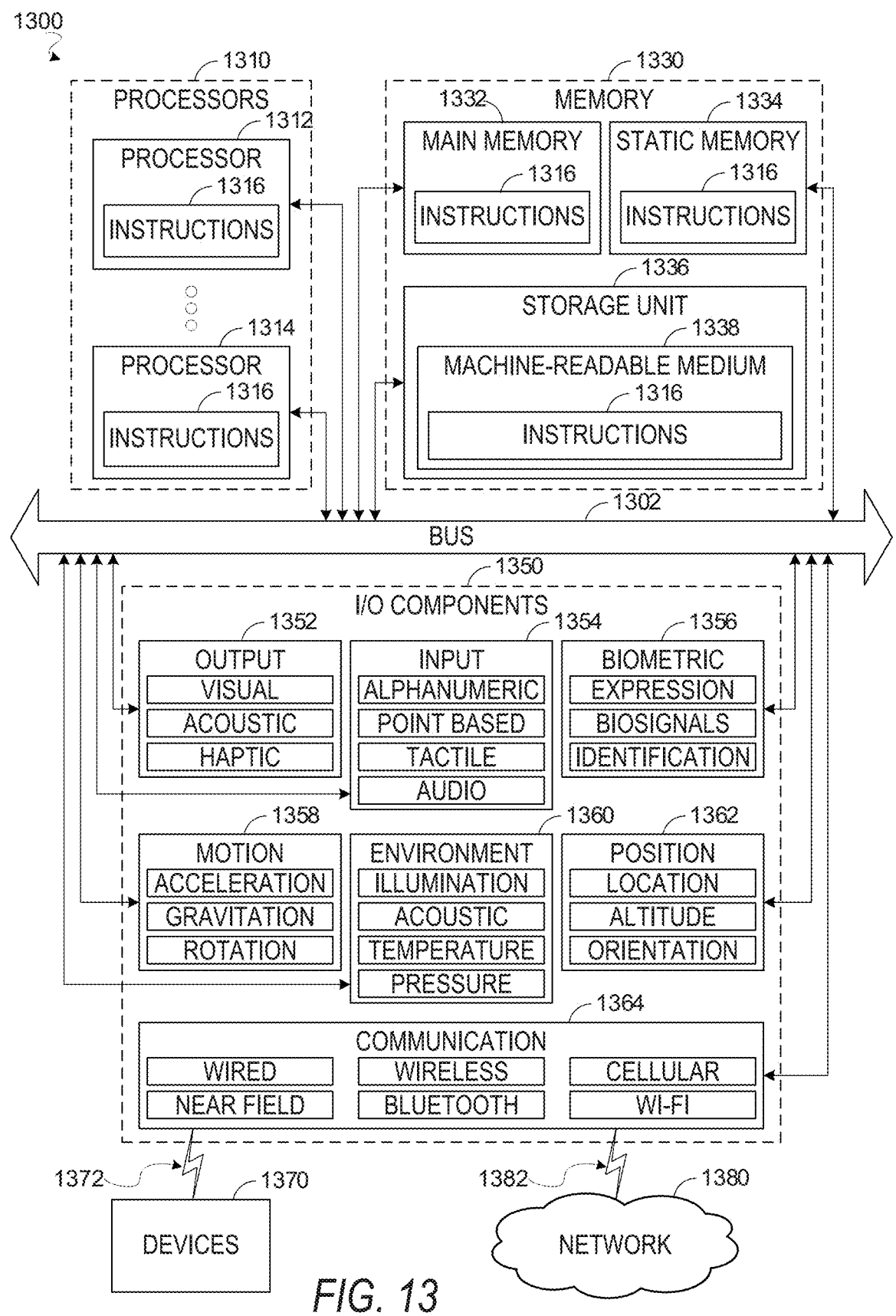
FIG. 13 illustrates a diagrammatic representation of an example machine in the form of a computer system within which a set of instructions may be executed for causing the machine to perform any one or more of the methodologies of various embodiments described herein.

FIG. 13 illustrates a diagrammatic representation of an example machine 1300 in the form of a computer system within which a set of instructions may be executed for causing the machine to perform any one or more of the methodologies of various embodiments described herein. Specifically, FIG. 13 shows a diagrammatic representation of the machine 1300 in the example form of a computer system, within which instructions 1316 (e.g., software, a program, an application, an applet, an app, or other executable code) for causing the machine 1300 to perform any one or more of the methodologies discussed herein may be executed. For example, the instructions 1316 may cause the machine 1300 to execute the method 800 of FIG. 8. Additionally, or alternatively, the instructions 1316 may implement FIGS. 8-11, and so forth. The instructions 1316 transform the general, non-programmed machine 1300 into a particular machine 1300 programmed to carry out the described and illustrated functions in the manner described. In alternative embodiments, the machine 1300 operates as a standalone device or may be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1316, sequentially or otherwise, that specify actions to be taken by the machine 1300. Further, while only a single machine 1300 is illustrated, the term "machine" shall also be taken to include a collection of machines 1300 that individually or jointly execute the instructions 1316 to perform any one or more of the methodologies discussed herein.

The machine 1300 may include processors 1310, memory 1330, and I/O components 1350, which may be configured to communicate with each other such as via a bus 1302. In some embodiments, the processors 1310 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1312 and a processor 1314 that may execute the instructions 1316. The term "processor" is intended to include multi-core processors that may comprise two or more independent processors (sometimes referred to as "cores") that may execute instructions contemporaneously. Although FIG. 13 shows multiple processors 1310, the machine 1300 may include a single processor with a single core, a single processor with multiple cores (e.g., a multi-core processor), multiple processors with a single core, multiple processors with multiples cores, or any combination thereof.

The memory 1330 may include a main memory 1332, a static memory 1334, and a storage unit 1336, both accessible to the processors 1310 such as via the bus 1302. The main memory 1330, the static memory 1334, and storage unit 1336 store the instructions 1316 embodying any one or more of the methodologies or functions described herein. The instructions 1316 may also reside, completely or partially, within the main memory 1332, within the static memory 1334, within the storage unit 1336, within at least one of the processors 1310 (e.g., within the processor's cache memory), or any suitable combination thereof, during execution thereof by the machine 1300.

The I/O components 1350 may include a wide variety of components to receive input, provide output, produce output, transmit information, exchange information, capture measurements, and so on. The specific I/O components 1350 that are included in a particular machine will depend on the type of machine. For example, portable machines such as mobile phones will likely include a touch input device or other such input mechanisms, while a headless server machine will likely not include such a touch input device. It will be appreciated that the I/O components 1350 may include many other components that are not shown in FIG. 13. The I/O components 1350 are grouped according to functionality merely for simplifying the following discussion and the grouping is in no way limiting. In various embodiments, the I/O components 1350 may include output components 1352 and input components 1354. The output components 1352 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1354 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further embodiments, the I/O components 1350 may include biometric components 1356, motion components 1358, environmental components 1360, or position components 1362, among a wide array of other components. For example, the biometric components 1356 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1358 may include acceleration sensor components (e.g., accelerometer), gravitation sensor components, rotation sensor components (e.g., gyroscope), and so forth. The environmental components 1360 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1362 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1350 may include communication components 1364 operable to couple the machine 1300 to a network 1380 or devices 1370 via a coupling 1382 and a coupling 1372, respectively. For example, the communication components 1364 may include a network interface component or another suitable device to interface with the network 1380. In further examples, the communication components 1364 may include wired communication components, wireless communication components, cellular communication components, Near Field Communication (NFC) components, Bluetooth® components (e.g., Bluetooth® Low Energy), WiFi® components, and other communication components to provide communication via other modalities. The devices 1370 may be another machine or any of a wide variety of peripheral devices (e.g., a peripheral device coupled via a USB).

Moreover, the communication components 1364 may detect identifiers or include components operable to detect identifiers. For example, the communication components 1364 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1364, such as location via Internet Protocol (IP) geolocation, location via Wi-Fi® signal triangulation, location via detecting an NFC beacon signal that may indicate a particular location, and so forth.

Executable Instructions and Machine Storage Medium

The various memories (i.e., 1330, 1332, 1334, and/or memory of the processor(s) 1310) and/or storage unit 1336 may store one or more sets of instructions and data structures (e.g., software) embodying or utilized by any one or more of the methodologies or functions described herein. These instructions (e.g., the instructions 1316), when executed by processor(s) 1310, cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various embodiments, one or more portions of the network 1380 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 1380 or a portion of the network 1380 may include a wireless or cellular network, and the coupling 1382 may be a Code Division Multiple Access (CDMA) connection, a Global System for Mobile communications (GSM) connection, or another type of cellular or wireless coupling. In this example, the coupling 1382 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1316 may be transmitted or received over the network 1380 using a transmission medium via a network interface device (e.g., a network interface component included in the communication components 1364) and utilizing any one of a number of well-known transfer protocols (e.g., hypertext transfer protocol (HTTP)). Similarly, the instructions 1316 may be transmitted or received using a transmission medium via the coupling 1372 (e.g., a peer-to-peer coupling) to the devices 1370. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1316 for execution by the machine 1300, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

Computer-Readable Medium

The terms "machine-readable medium," "computer-readable medium" and "device-readable medium" mean the same thing and may be used interchangeably in this disclosure. The terms are defined to include both machine-storage media and transmission media. Thus, the terms include both storage devices/media and carrier waves/modulated data signals.

Examples

According to some embodiments, a method comprises: accessing telemetry data associated with a machine; evaluating the telemetry data to identify a set of triggered alerts triggered by the machine; accessing alert dependency data that describes a set of dependencies between a plurality of alerts; and filtering the set of triggered alerts based on the alert dependency data to generate a set of active alerts. One or more operations of the method can be performed by one or more hardware processors.

For some embodiments, where the filtering the set of triggered alerts based on the alert dependency data to generate the set of active alerts comprises: determining, based on the alert dependency data, whether a first triggered alert in the set of triggered alerts is dependent upon any other triggered alert in the set of triggered alerts; and in response to determining that the first triggered alert is dependent upon a second triggered alert in the set of triggered alerts, generating the set of active alerts to exclude the first triggered alert.

For some embodiments, where the filtering the set of triggered alerts based on the alert dependency data to generate a set of active alerts comprises: determining, based on the alert dependency data, whether a first triggered alert in the set of triggered alerts is dependent upon any other triggered alert in the set of triggered alerts; and in response to determining that the first triggered alert is not dependent upon any other triggered alert in the set of triggered alerts, generating the set of active alerts to include the first triggered alert.

For some embodiments, where the plurality of alerts comprises a first alert and a second alert, and the set of dependencies comprises a particular dependency that describes that an occurrence of the first alert is dependent upon an occurrence of the second alert.

For some embodiments, where the alert dependency data is generated based on historical active alert data or correlation data between at least two alerts.

For some embodiments, where the evaluating the telemetry data to identify the set of triggered alerts for the machine comprises: obtaining, from the telemetry data, alert data for a set of identifiable alerts; and generating time-series alert data based on the alert data to identify the set of triggered alerts.

For some embodiments, where the generating the time-series alert data based on the alert data to identify the set of triggered alerts comprises: for a given identifiable alert described in the alert data, recording a time for each time a given metric, associated with the given identifiable alert, surpasses a threshold value.

For some embodiments, where the generating the time-series alert data based on the alert data to identify the set of triggered alerts comprises: for a given identifiable alert described in the alert data, in response to each time a given metric, associated with the given identifiable alert, surpasses a threshold value, recording an amount by which the given metric surpasses the threshold value.

For some embodiments, where the telemetry data comprises at least one of metric data regarding operation of the machine or log data generated by the machine.

For some embodiments, where the method further comprises storing the set of active alerts as historical active alert data.

For some embodiments, where the method further comprises performing alert dependency analysis, based on the set of active alerts and historical active alert data, to update the alert dependency data.

For some embodiments, where the alert dependency data is generated based on user-provided dependency mapping between two or more alerts.

For some embodiments, where the evaluating the telemetry data to identify the set of triggered alerts for the machine comprises: performing a set of searches with respect to the telemetry data, the set of searches corresponding to a set of identifiable alerts.

According to some embodiments, a method comprises: accessing historical active alert data describing previous occurrences of a plurality of active alerts for a machine; selecting a set of candidate active alerts for correlation with respect to a particular active alert in the plurality of active alerts, the set of candidate active alerts being selected from the plurality of active alerts based on the historical active alert data; for each candidate active alert in the set of candidate active alerts: generating a score for the candidate active alert based on a metric associated with the candidate active alert and the particular active alert; and determining whether the particular active alert is dependent on the candidate active alert based on the score generated for the candidate active alert; and in response to determining that the particular active alert depends on the candidate active alert based on the score, storing a dependency of the particular active alert on the candidate active alert, the storing the dependency comprising storing the dependency in alert dependency data that describes a set of dependencies between a plurality of alerts. One or more operations of the method can be performed by one or more hardware processors.

For some embodiments, where the selecting the set of candidate active alerts for correlation with respect to the particular active alert comprises: selecting the set of candidate active alerts, from the historical active alert data, based on a time criterion defined with respect to the particular active alert.

For some embodiments, where the time criterion defines a time window preceding the particular active alert.

For some embodiments, where the metric associated with the candidate active alert and the particular active alert comprises a value representing an amount of time the candidate active alert precedes the particular active alert.

For some embodiments, where the value is determined based on the historical active alert data.

For some embodiments, where the alert dependency data comprises a directed acyclic graph that describes a dependency between two or more alerts.

For some embodiments, where the method further comprises: accessing telemetry data associated with the machine; evaluating the telemetry data to identify a set of triggered alerts triggered by the machine; and filtering the set of triggered alerts based on the alert dependency data to generate a set of active alerts.

For some embodiments, where the determining whether the particular active alert is dependent on the candidate active alert based on the score generated for the candidate active alert comprises: determining that the particular active alert is dependent on the candidate active alert in response to the score surpassing a score threshold.

According to some embodiments, a method comprises: periodically monitoring a machine for a set of active alerts based on a monitoring frequency; generating an alert state for the machine based on the set of active alerts, the alert state describing the set of active alerts with respect to a set of identifiable alerts for the machine; and adjusting the monitoring frequency based on the alert state. One or more operations of the method can be performed by one or more hardware processors.

For some embodiments, where the adjusting the monitoring frequency based on the alert state comprises: determining whether the alert state represents a change in comparison to a prior determined alert state; and adjusting the monitoring frequency based on the determining of whether the alert state represents the change.

For some embodiments, where the adjusting the monitoring frequency based on the determining of whether the alert state represents the change comprises: increasing the monitoring frequency in response to the change indicating an increase in active alerts.

For some embodiments, where the adjusting the monitoring frequency based on the determining of whether the alert state represents the change comprises: decreasing the monitoring frequency in response to the change indicating a decrease in active alerts.

For some embodiments, where the alert state comprises a vector representing a plurality of statuses corresponding to the set of identifiable alerts for the machine.

For some embodiments, where each status of the plurality of statuses comprises a value of on or off.

For some embodiments, where the method further comprises: generating a health score for the machine based on the alert state.

For some embodiments, where the generating the health score comprises: applying to the alert state a set of weights that corresponds to the set of identified alerts to generate intermediate alert state data; and calculating a dot product of the alert state based on the intermediate alert state data to generate the health score.

For some embodiments, where the periodically monitoring the machine for the set of active alerts based on the monitoring frequency comprises: accessing telemetry data associated with the machine; and evaluating the telemetry data to identify a set of triggered alerts triggered by the machine; accessing alert dependency data that describes a set of dependencies between a plurality of alerts; and filtering the set of triggered alerts based on the alert dependency data to generate the set of active alerts.

For some embodiments, where the evaluating the telemetry data to identify the set of triggered alerts for the machine comprises: generating time-series alert data based on the telemetry data to identify the set of triggered alerts, the generating the time-series alert data based on the telemetry data to identify the set of triggered alerts comprising: for a given identifiable alert in the set of identifiable alerts, recording a time for each time a given metric associated the given identifiable alert surpasses a threshold value.

For some embodiments, where the method further comprises: adjusting the threshold value based on the alert state.

For some embodiments, where the method further comprises: adjusting the threshold value based on a temporary override.

For some embodiments, the operations or features described herein are implemented via a non-transitory computer-readable medium or as a system.

The disclosed technology may be described in the context of computer-executable instructions, such as software or program modules, being executed by a computer or processor. The computer-executable instructions may comprise portions of computer program code, routines, programs, objects, software components, data structures, or other types of computer-related structures that may be used to perform processes using a computer. In some cases, hardware or combinations of hardware and software may be substituted for software or used in place of software.

Computer program code used for implementing various operations or aspects of the disclosed technology may be developed using one or more programming languages, including an object-oriented programming language such as Java or C++, a procedural programming language such as the "C" programming language or Visual Basic, or a dynamic programming language such as Python or JavaScript. In some cases, computer program code or machine-level instructions derived from the computer program code may execute entirely on an end user's computer, partly on an end user's computer, partly on an end user's computer and partly on a remote computer, or entirely on a remote computer or server.

For purposes of this document, it should be noted that the dimensions of the various features depicted in the Figures may not necessarily be drawn to scale.

For purposes of this document, reference in the specification to "an embodiment," "one embodiment," "some embodiments," or "another embodiment" may be used to describe different embodiments and do not necessarily refer to the same embodiment.

For purposes of this document, a connection may be a direct connection or an indirect connection (e.g., via another part). In some cases, when an element is referred to as being connected or coupled to another element, the element may be directly connected to the other element or indirectly connected to the other element via intervening elements. When an element is referred to as being directly connected to another element, then there are no intervening elements between the element and the other element.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
accessing, by one or more hardware processors, historical active alert data describing previous occurrences of a plurality of active alerts for a machine;
selecting, by the one or more hardware processors, a set of candidate active alerts for correlation with respect to a particular active alert in the plurality of active alerts, the set of candidate active alerts being selected from the plurality of active alerts based on the historical active alert data;
for each candidate active alert in the set of candidate active alerts:
generating, by the one or more hardware processors, a score for the candidate active alert based on a metric that comprises a value representing an amount of time the candidate active alert precedes the particular active alert; and
determining, by the one or more hardware processors, whether the particular active alert is dependent on the candidate active alert based on the score generated for the candidate active alert; and
in response to determining that the particular active alert depends on the candidate active alert based on the score, storing, by the one or more hardware processors, a dependency of the particular active alert on the candidate active alert, the storing the dependency comprising storing the dependency in alert dependency data that describes a set of dependencies between a plurality of alerts.

2. The method of claim 1, wherein the selecting the set of candidate active alerts for correlation with respect to the particular active alert comprises:
selecting the set of candidate active alerts, from the historical active alert data, based on a time criterion defined with respect to the particular active alert.

3. The method of claim 2, wherein the time criterion defines a time window preceding the particular active alert.

4. The method of claim 1, the value is determined based on the historical active alert data.

5. The method of claim 1, wherein the alert dependency data comprises a directed acyclic graph that describes a dependency between two or more alerts.

6. The method of claim 1, further comprising:
accessing, by the one or more hardware processors, telemetry data associated with the machine;
evaluating, by the one or more hardware processors, the telemetry data to identify a set of triggered alerts triggered by the machine; and
filtering, by the one or more hardware processors, the set of triggered alerts based on the alert dependency data to generate a set of active alerts.

7. The method of claim 1, wherein the determining whether the particular active alert is dependent on the candidate active alert based on the score generated for the candidate active alert comprises:
determining that the particular active alert is dependent on the candidate active alert in response to the score surpassing a score threshold.

8. A system comprising:
a memory storing instructions; and
one or more hardware processors communicatively coupled to the memory and configured by the instructions to perform operations comprising:
accessing historical active alert data describing previous occurrences of a plurality of active alerts for a machine;
selecting a set of candidate active alerts for correlation with respect to a particular active alert in the plurality of active alerts, the set of candidate active alerts being selected from the plurality of active alerts based on the historical active alert data;
for each candidate active alert in the set of candidate active alerts:
generating a score for the candidate active alert based on a metric that comprises a value representing an amount of time the candidate active alert precedes the particular active alert; and
determining whether the particular active alert is dependent on the candidate active alert based on the score generated for the candidate active alert; and
in response to determining that the particular active alert depends on the candidate active alert based on the score, storing a dependency of the particular active alert on the candidate active alert, the storing the dependency comprising storing the dependency in alert dependency data that describes a set of dependencies between a plurality of alerts.

9. The system of claim 8, wherein the selecting the set of candidate active alerts for correlation with respect to the particular active alert comprises:
selecting the set of candidate active alerts, from the historical active alert data, based on a time criterion defined with respect to the particular active alert.

10. The system of claim 9, wherein the time criterion defines a time window preceding the particular active alert.

11. The system of claim 8, wherein the value is determined based on the historical active alert data.

12. The system of claim 8, wherein the alert dependency data comprises a directed acyclic graph that describes a dependency between two or more alerts.

13. The system of claim 8, wherein the operations further comprise:
accessing telemetry data associated with the machine;
evaluating the telemetry data to identify a set of triggered alerts triggered by the machine; and
filtering the set of triggered alerts based on the alert dependency data generate a set of active alerts.

14. The system of claim 8, wherein the determining whether the particular active alert is dependent on the candidate active alert based on the score generated for the candidate active alert comprises:

determining that the particular active alert is dependent on the candidate active alert in response to the score surpassing a score threshold.

15. A non-transitory computer-readable storage medium comprising instructions that, when executed by a processing device, cause the processing device to perform operations comprising:

accessing historical active alert data describing previous occurrences of a plurality of active alerts for a machine;

selecting a set of candidate active alerts for correlation with respect to a particular active alert in the plurality of active alerts, the set of candidate active alerts being selected from the plurality of active alerts based on the historical active alert data;

for each candidate active alert in the set of candidate active alerts:

generating a score for the candidate active alert based on a metric that comprises a value representing an amount of time the candidate active alert precedes the particular active alert; and determining whether the particular active alert is dependent on the candidate active alert based on the score generated for the candidate active alert; and in response to determining that the particular active alert depends on the candidate active alert based on the score, storing a dependency of the particular active alert on the candidate active alert, the storing the dependency comprising storing the dependency in alert dependency data that describes a set of dependencies between a plurality of alerts.

16. The non-transitory computer-readable storage medium of claim 15, wherein the selecting the set of candidate active alerts for correlation with respect to the particular active alert comprises:

selecting the set of candidate active alerts, from the historical active alert data, based on a time criterion defined with respect to the particular active alert.

17. The non-transitory computer-readable storage medium of claim 15, wherein the operations further comprise:

accessing telemetry data associated with the machine;

evaluating the telemetry data to identify a set of triggered alerts triggered by the machine; and filtering the set of triggered alerts based on the alert dependency data to generate a set of active alerts.

* * * * *

UNITED STATES PATENT AND TRADEMARK OFFICE
CERTIFICATE OF CORRECTION

PATENT NO. : 11,099,963 B2
APPLICATION NO. : 16/264264
DATED : August 24, 2021
INVENTOR(S) : Arora et al.

Page 1 of 1

It is certified that error appears in the above-identified patent and that said Letters Patent is hereby corrected as shown below:

On the Title Page

On page 2, in Column 2, item (56) under "Other Publications", Line 9, delete "May 5, 2020" and insert --Jun. 5, 2020-- therefor In the Drawings Sheet 14 of 15, Fig. 12, insert --1200--

In the Specification

In Column 28, Line 8, delete "802" and insert --805-- therefor

In Column 31, Line 40, after "ANDROID™", insert --,--

In the Claims

In Column 39, Line 60, in Claim 4, after "claim 1,", insert --wherein--

In Column 40, Line 65, in Claim 13, after "data", insert --to--

Signed and Sealed this
Eleventh Day of January, 2022

Drew Hirshfeld
*Performing the Functions and Duties of the*
*Under Secretary of Commerce for Intellectual Property and*
*Director of the United States Patent and Trademark Office*